(12) United States Patent
Karashima et al.

(10) Patent No.: US 7,689,129 B2
(45) Date of Patent: Mar. 30, 2010

(54) SYSTEM-IN-PACKAGE OPTICAL TRANSCEIVER IN OPTICAL COMMUNICATION WITH A PLURALITY OF OTHER SYSTEM-IN-PACKAGE OPTICAL TRANSCEIVERS VIA AN OPTICAL TRANSMISSION LINE

(75) Inventors: Seiji Karashima, Osaka (JP); Seiichi Nakatani, Osaka (JP); Yoshiyuki Saito, Osaka (JP)

(73) Assignee: Panasonic Corporation, Osaka (JP)

( * ) Notice: Subject to any disclaimer, the term of this patent is extended or adjusted under 35 U.S.C. 154(b) by 369 days.

(21) Appl. No.: 11/201,234

(22) Filed: Aug. 10, 2005

(65) Prior Publication Data
US 2006/0036831 A1    Feb. 16, 2006

(30) Foreign Application Priority Data
Aug. 10, 2004    (JP)    .............. 2004-233454

(51) Int. Cl.
H04B 10/00    (2006.01)
(52) U.S. Cl. .................................................. 398/164
(58) Field of Classification Search ................ 398/164; 385/15, 39
See application file for complete search history.

(56) References Cited

U.S. PATENT DOCUMENTS

| | | | |
|---|---|---|---|
| 5,602,663 A | | 2/1997 | Hamaguchi et al. |
| 5,604,835 A | * | 2/1997 | Nakamura et al. .......... 385/129 |
| 5,740,463 A | * | 4/1998 | Oshima et al. ................. 712/11 |
| 5,802,338 A | * | 9/1998 | Rechtschaffen et al. ..... 712/217 |
| 5,937,117 A | * | 8/1999 | Ishida et al. ................... 385/24 |
| 6,160,653 A | * | 12/2000 | Davidson .................... 398/164 |
| 6,768,827 B2 | * | 7/2004 | Yoo .............................. 385/14 |
| 6,785,800 B1 | * | 8/2004 | Yamaura et al. .............. 712/22 |
| 6,823,140 B1 | * | 11/2004 | Davidson ...................... 398/73 |
| 6,855,572 B2 | * | 2/2005 | Jeung et al. .................. 438/106 |
| 6,861,288 B2 | * | 3/2005 | Shim et al. ................... 438/109 |
| 7,020,400 B2 | * | 3/2006 | Trezza et al. ................. 398/164 |
| 7,103,248 B2 | * | 9/2006 | Ouchi ........................... 385/40 |
| 7,211,469 B2 | * | 5/2007 | Kwon .......................... 438/113 |
| 7,215,033 B2 | * | 5/2007 | Lee et al. ..................... 257/777 |
| 7,245,796 B2 | * | 7/2007 | Ouchi ........................... 385/14 |
| 7,248,890 B1 | * | 7/2007 | Raghavan et al. ........... 455/522 |
| 7,286,770 B2 | * | 10/2007 | Doyle et al. ................. 398/166 |
| 7,309,999 B2 | * | 12/2007 | Ong ............................. 324/765 |
| 7,349,460 B2 | * | 3/2008 | Choi et al. ................... 375/146 |

(Continued)

FOREIGN PATENT DOCUMENTS

EP    1 017 243 A2    7/2000

(Continued)

*Primary Examiner*—Agustin Bello
(74) *Attorney, Agent, or Firm*—RatnerPrestia

(57) ABSTRACT

A parallel computation apparatus as a multiprocessor includes functional modules as a plurality of processors having an optical communication function and capable of mutually cooperating, and an optical transmission line interconnecting the plurality of processors. Among the plurality of functional modules, the first functional module having a first information processing capacity has a function of determining whether information processing of a first information processing amount can be completed based on the first information processing capacity, and outputting a second information processing amount obtained by subtracting an information processing amount based on the first information processing capacity from the first information processing amount to at least one of the other functional modules.

5 Claims, 17 Drawing Sheets

U.S. PATENT DOCUMENTS

| | | | |
|---|---|---|---|
| 7,362,702 B2* | 4/2008 | Terrell et al. | 370/230 |
| 7,373,111 B2* | 5/2008 | Gupta | 455/41.3 |
| 2002/0097962 A1* | 7/2002 | Yoshimura et al. | 385/50 |
| 2002/0109074 A1* | 8/2002 | Uchida | 250/214.1 |
| 2002/0154354 A1 | 10/2002 | Raj et al. | |
| 2003/0080400 A1* | 5/2003 | Okamoto et al. | 257/678 |
| 2003/0091243 A1* | 5/2003 | Sasada | 382/260 |
| 2003/0112652 A1 | 6/2003 | Shimada et al. | |
| 2003/0120713 A1* | 6/2003 | Fenchel | 709/108 |
| 2003/0181218 A1* | 9/2003 | Mukai et al. | 455/550.1 |
| 2004/0098718 A1 | 5/2004 | Yoshii et al. | |
| 2004/0136715 A1* | 7/2004 | Kondo | 398/82 |
| 2005/0104181 A1* | 5/2005 | Lee et al. | 257/686 |
| 2005/0163116 A1* | 7/2005 | Anderson et al. | 370/389 |
| 2005/0186909 A1* | 8/2005 | Gupta | 455/41.3 |
| 2005/0255722 A1* | 11/2005 | Salmon | 439/67 |
| 2006/0036831 A1* | 2/2006 | Karashima et al. | 711/206 |
| 2006/0103421 A1* | 5/2006 | Hirata | 326/62 |
| 2007/0013402 A1* | 1/2007 | Ong et al. | 324/765 |
| 2007/0086723 A1* | 4/2007 | Sasaki et al. | 385/137 |
| 2008/0112703 A1* | 5/2008 | Beausoleil et al. | 398/50 |

FOREIGN PATENT DOCUMENTS

| | | |
|---|---|---|
| JP | 6-309285 | 11/1994 |
| JP | 7-141312 A | 6/1995 |
| JP | 7-295843 A | 11/1995 |
| JP | 10-200540 | 7/1998 |
| JP | 10-243424 | 9/1998 |
| JP | 11-355249 A | 12/1999 |
| JP | 2000-197078 A | 7/2000 |
| JP | 2003-133507 | 5/2003 |
| JP | 2003-188351 | 7/2003 |

* cited by examiner

SYSTEM-IN-PACKAGE OPTICAL TRANSCEIVER IN OPTICAL COMMUNICATION WITH A PLURALITY OF OTHER SYSTEM-IN-PACKAGE OPTICAL TRANSCEIVERS VIA AN OPTICAL TRANSMISSION LINE

BACKGROUND OF THE INVENTION

1. Field of the Invention

The present invention relates to a multiprocessor which can be used as, for example, a parallel computation apparatus and an optical functional device.

2. Related Art of the Invention

With miniaturization and enhancement of functions of electronic devices in recent years, attention has been given to a system-on-chip (SoC) realizing high-density and high-functional packaging using a system LSI in which a semiconductor device of one chip is equipped with a large number of functions (e.g. Japanese Patent Laid-Open No. 2003-188351). In the SoC, a plurality of functions are integrated into one chip with each thereof as a functional block, and functional blocks are interconnected by an internal data bus, and therefore the speed of operations can be enhanced by using the SoC.

Use of the SoC offers various advantages such as an advantage that the speed of operations can be enhanced, while it brings about significant disadvantages in terms of costs, time required for design and development, and the like. Namely, since the circuit size in a semiconductor integrated circuit increases, an increase in the number of man-hours for development, an increase infrequency of debug, and the like raise serious problems. There are cases where it is not inevitable to form all necessary parts as semiconductor integrated circuits, and in addition, if design and development is to be conducted on every occasion in response to upgrades of products, an increase in development cost and a delay of delivery of products tend to occur. Furthermore, there are cases where the SoC cannot be packaged in a product in terms of costs.

In the meantime, aside from the SoC, research and development on a system in packaging (SiP) realizing a high-density and high-functional packaging by forming one package product with one or more semiconductor chip and a plurality of active components and passive components has been vigorously conducted (e.g. Japanese Patent Laid-Open No. 2003-133507). The SiP requires some packaging area compared with the SoC, but allows individual completed devices to be used, and therefore has a significant advantage in terms of costs, time for design and development, and the like.

However, if the SiP is used, the data transmission speed decreases as a whole no matter how fast the data transmission speed in a semiconductor chip because electronic components such as semiconductor chips are interconnected via a wiring board. Namely, in the SoC, functional blocks placed in one chip are interconnected by the internal data bus, and therefore data can be transferred at a high speed, while in the SiP, semiconductor chips within one package are interconnected via the wiring board, and therefore the data transfer speed is limited, thus inevitably decreasing the operation speed.

In this way, both the SoC and SiP have problems, and it is difficult in actuality to solve the problems.

Use of a parallel computer system intended for efficient runs by coupling together a plurality of processors using the above-mentioned SoC and running the processors at a time in parallel, instead of computation processing by a single processor, is under consideration as means meeting a request for enhancement of a calculation capacity (e.g. Japanese Patent Laid-Open No. 6-309285).

However, the parallel computer system described above has a disadvantage that transmission between processors is retarded because a plurality of processors are coupled together. Namely, the data transmission capacity of a data bus in the exterior of a semiconductor element (processor) is low compared with the data transmission capacity of a data bus in the interior of the semiconductor element (processor), and therefore this point is a bottleneck and the computation processing capacity cannot be fully exploited from a viewpoint of an entire system.

Namely, the system having a plurality of processors coupled together, such as the conventional parallel computer system, has a problem such that the computation processing capacity cannot be fully exploited as the entire system.

In consideration of the above problems, the object of the present invention is to provide a multiprocessor having a high data transmission capacity and computation processing capacity as an entire system.

SUMMARY OF THE INVENTION

The $1^{st}$ aspect of the present invention is multiprocessor comprising:

a plurality of processors having an optical communication function and capable of mutually cooperating; and an optical transmission line interconnecting said plurality of processors.

The $2^{nd}$ aspect of the present invention is the multiprocessor according to the $1^{st}$ aspect of the present invention, further comprising a wavelength router provided on said optical transmission line and controlling optical communication between said plurality of processors.

The $3^{rd}$ aspect of the present invention is the multiprocessor according to the $1^{st}$ aspect of the present invention, wherein said processor has:

at least one laser element emitting light of multiple wavelengths;

a filter filtering said light of multiple wavelengths into light of a predetermined wavelength; and a light receiving element receiving said light of a predetermined wavelength.

The $4^{th}$ aspect of the present invention is the multiprocessor according to the $3^{rd}$ aspect of the present invention, wherein said wavelength router has a plurality of input ports and a plurality of output ports, and said wavelength router has a function of outputting light input to any one of said plurality of input ports to any uniquely determined output port of said plurality of output ports according to the wavelength of the input light.

The $5^{th}$ aspect of the present invention is the multiprocessor according to the $1^{st}$ aspect of the present invention, wherein said optical transmission lines are provided in an independent number for each of said plurality of processors.

The $6^{th}$ aspect of the present invention is the multiprocessor according to the $1^{st}$ aspect of the present invention, wherein all or part of said plurality of processors operate mutually asynchronously.

The $7^{th}$ aspect of the present invention is the multiprocessor according to the $1^{st}$ aspect of the present invention, wherein said processors constitute a system-in-package configuration having a plurality of components mutually communicating electrically.

The $8^{th}$ aspect of the present invention is the multiprocessor according to the $7^{th}$ aspect of the present invention, wherein said system-in-package has an internal input/output terminal to which said optical transmission line is connected, and a computation processing portion connected to said internal input/output terminal, and said computation processing portion has a control portion, a storage portion, and an application processor portion performing information processing.

The 9$^{th}$ aspect of the present invention is the multiprocessor according to the 7$^{th}$ aspect of the present invention, wherein said system-in-package further comprises an external input/output terminal connected to said computation processing portion.

The 10$^{th}$ aspect of the present invention is the multiprocessor according to the 1$^{st}$ aspect of the present invention, wherein among said plurality of processors, a first processor having a first information processing capacity has a function of determining whether information processing of a first information processing amount can be completed based on said first information processing capacity when said first information amount is input, and outputting a second information processing amount obtained by subtracting an information processing amount based on said first information processing capacity from said first information processing amount to at least one of said plurality of processors other than said first processor if it is determined that said processing cannot be completed.

The 11$^{th}$ aspect of the present invention is the multiprocessor according to the 10$^{th}$ aspect of the present invention, wherein at least one of said plurality of processors other than said first processor, to which said second information processing amount is input, has a function of determining whether processing of said second processing amount can be completed based on its own second information processing capacity, and outputting a third information processing amount obtained by subtracting an information processing amount based on said second information processing capacity from said second information processing amount to at least one of said plurality of processors other than itself and said first processor if it is determined that said processing cannot be completed.

For achieving the above object, the present invention can provide a multiprocessor having a high data transmission capacity and computation processing capacity as an entire system.

BRIEF DESCRIPTION OF THE DRAWINGS

FIG. 10 is a sectional view of main parts of an optical input/output SiP 10a;

| | Description of Symbols |
|---|---|
| 10 (11-14) | system-in-package (or functional module) |
| 17 | board |
| 19 | external input/output optical module |
| 20 | internal network |
| 21 | optical transmission line |
| 22 | full mesh type array waveguide |
| 22 | wavelength router |
| 22a | input waveguide |
| 22b | output waveguide |
| 23 | laser element |
| 23 | wavelength multiplexer |
| 24 | external network |
| 25 | laser element (semiconductor laser) |
| 26 | light receiving, element |
| 27 | filter |
| 28 | slab waveguide |
| 29 | array waveguide |
| 30 | interposer |
| 31 | control portion |
| 32 | storage portion |
| 33 | application processor portion |
| 36 | optical input/output terminal |
| 36 | internal input/output terminal |
| 37 | external terminal |
| 40 | semiconductor element |
| 43 | photo conversion element |
| 45 | lens |
| 47 | mirror |
| 50 | network |
| 100 | parallel computation apparatus |
| 100 | optical functional device |
| 101 | chip |
| 103 | board |
| 104 | backplane |
| 105 | network |
| 110 | communication system apparatus |
| 201-203 | boards |
| 210 | ultra high-functional module |
| 300 | computation circuit |
| 301-304 | specific functional blocks |
| 305 | program portion |
| 307 | board |

-continued

| | Description of Symbols |
|---|---|
| 500 | optical switch |
| 503 | wavelength router |
| 504 | optical receiver |
| 505 | control circuit |
| 507 | variable wavelength light source |
| 508 | frequency multiplexing type buffer |
| 581 | time selector |
| 582 | wavelength selector |

PREFERRED EMBODIMENTS OF THE INVENTION

Before description of the present invention, the present inventor first conducted a study on the current circumstance as to construction of a parallel computation apparatus excellent in applicability and extensibility. This will be described with reference to FIGS. 1 to 5.

Figure 1:
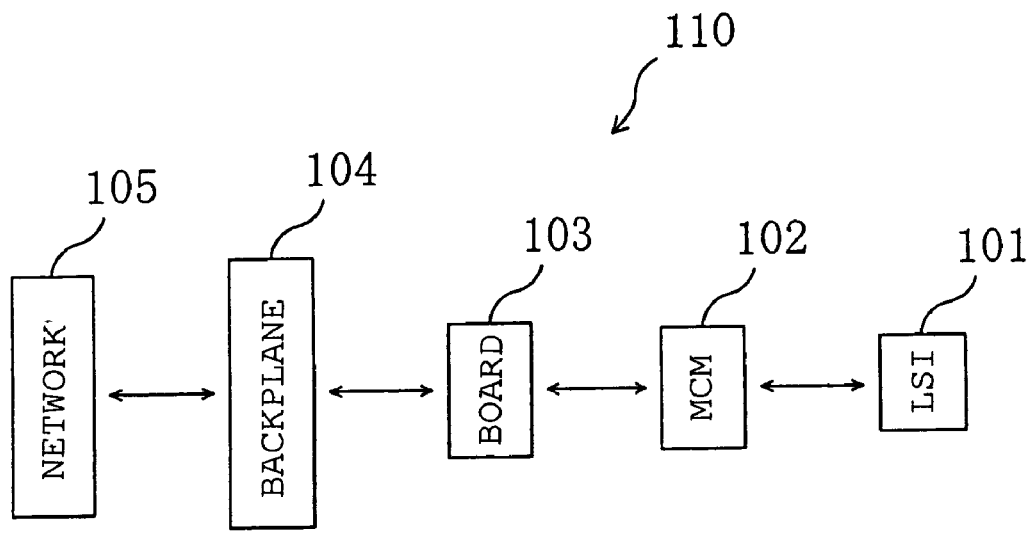
FIG. 1 shows a packaging hierarchy of a typical communication system apparatus.

A computation apparatus (computer), not just a parallel computation apparatus, is often connected to an external network for input/output of data, and hence equipped with a communication function. FIG. 1 shows a packaging hierarchy of a typical communication system apparatus.

For explanation of the packaging hierarchy shown in FIG. 1, one of elements constituting a communication system apparatus 110 is an LSI chip (semiconductor element) 101, a plurality of LSI chips 101 are integrated to form an MCM (multi chip module) 102, and the MCM 102 is packaged on a board (print board) 103. The board 103 is packaged in a backplane 104, and the backplane 104 is connected to a network 105. Nowadays, an optical communication network is often used for the network 105 for transmitting bulk data. With advancement of technology of semiconductor elements, speed enhancement of the LSI chip 101 is under progress.

It is estimated that in future, the transmission speed of the network 105 will increase from 10 GHz to 40 GHz, and the operation speed of the LSI chip will increase from the currently maximum level 3 GHz to 10 GHz. Attention is often given exclusively to an increase in speeds of the network 105 and the LSI chip 101, but in fact, the processing speed of the entire apparatus 110 is also dependent on the speed of transmission between the hierarchies (101 and 102, 102 and 103, 103 and 104, and 104 and 105) as a matter of course. Namely, even if data at a GHz level is input from the network 105, the data cannot be processed directly by the LSI chip 101, but is transmitted at an MHz level (from 104 to 102), and then input to the LSI chip 101, and computation processing at the GHz level is performed in the LSI chip 101. Similarly, even if computation processing of GHz level is performed in the LSI chip 101, the data is transmitted at the MHz level (from 104 to 102), and then output to the network 105.

Figure 2:
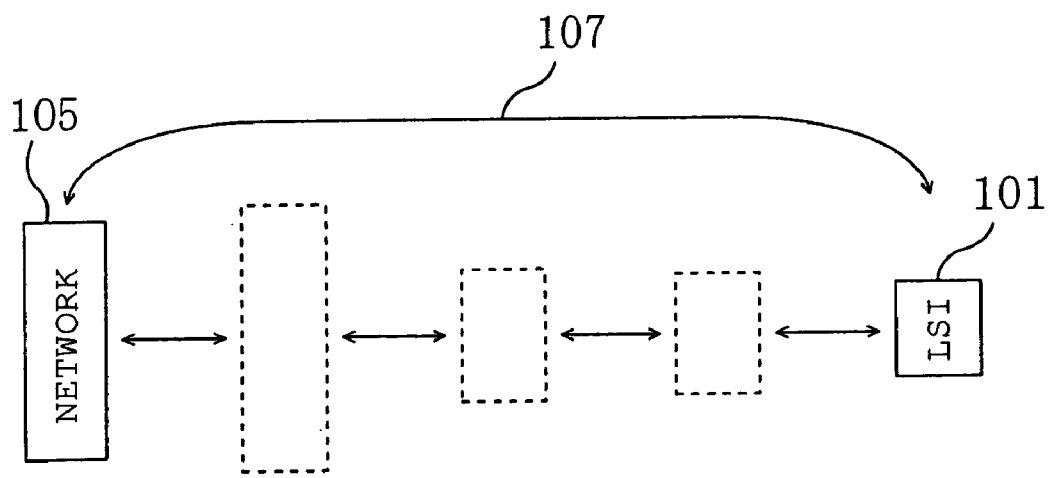
FIG. 2 is a view (imaginary view) for explaining a state of providing a link 107 between the speeds of an LSI chip 101 and a network 105.
Figure 3:
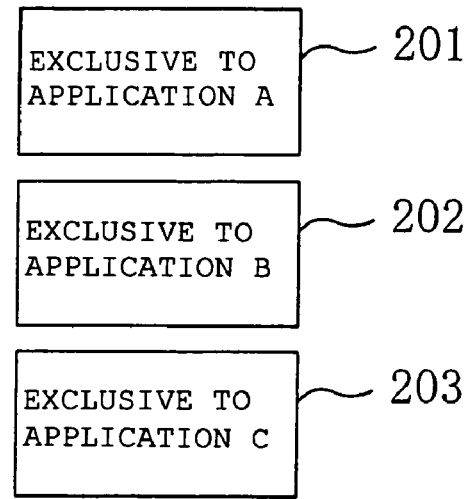
FIG. 3(a) shows boards 201 to 203 exclusive to respective applications.
FIG. 3(b) shows an ultra high-functional module 210.
Figure 3:
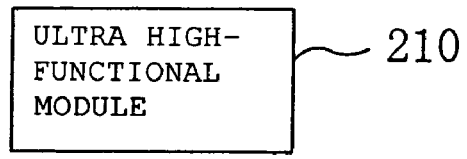

In such a circumstance, the inventor thought that if an apparatus capable of providing a link (107) between the speeds of the LSI chip 101 and the network 105 as shown in FIG. 2 could be constructed, a high-performance computation apparatus linking processing to transmission at the GHz level could be realized. If this apparatus is used, futuristic bulk transmission at a 40 GHz level will be realized, and when computation processing at a 10 GHz level is realized, their synergy effect will be still further attractive. Moreover, even at a current level, if a link (107) between the speeds of the LSI chip 101 and the network 105 can be provided, a computation apparatus performing processing and transmission at the GHz level can be realized without a wait for new innovative technological development of the network 105 and the LSI chip 101, which is also attractive.

The inventor gave attention to another aspect. Another aspect to which the inventor gave attention will be described below.

Nowadays, the LSI chip 101, the MCM 102, the board 103 and the like are designed for each application. Namely, since a board or the like exclusive to each application is designed, a board 201 exclusive to an application A is designed for the application A, a board 202 exclusive to an application B is designed for the application B, and a board 203 exclusive to an application C is designed for the application C as shown in FIG. 3(a). Discrete design for each application requires manpower and days proportionately. For example, for an application to analyze genes of organisms, a board exclusive to the application is designed, and for an application to decode compressed image and voice data compressed with MPEG (Moving Picture Expert Group), a board exclusive to the application is designed.

As shown in FIG. 3(b), an ultra high-functional module 210 dealing with all applications can be designed, but in this case, a module meeting the maximum specification of each application is designed in principle as the ultra high-functional module 210, and therefore it is often difficult to make a design and the tendency of increasing the cost becomes strong. Examples of the ultra high-functional module 210 include a module having a configuration of a general purpose computer such as a personal computer.

Both the approaches shown in FIGS. 3(a) and 3(b) are lacking in flexibility and have a risk of having to make an extensive investment. Namely, for the approach shown in FIG. 3(a), an exclusive module (e.g. board) is designed for each application, and therefore flexibility is poor because of the exclusiveness. For the approach shown in FIG. 3(b), it is meant to make an exclusive module (board) capable of dealing with all the applications, a capability of dealing with other applications is therefore actually limited, and it is actually difficult to incorporate therein a function capable of dealing with a new application. The ultra high-functional module 210 has a high unit price, and therefore producing such a high unit price product in large quantity for a product capable of functionally realizing each application itself with an inexpensive board results in incurrence of a risk. That is, there is a background leading to hesitation in making an extensive investment.

Although the parallel computer system uses a plurality of processors, it employs a system in which a circuit configuration is predetermined so as to obtain a solution for a certain application with optimum efficiency, and therefore the parallel computer system is suitable for performing exclusive computation processing, but has a disadvantage that it is poor in applicability and extensibility when applied to usual various purposes.

The inventor will make it clear below that the present invention solves the above disadvantages as well.

The embodiments of the present invention will be described below with reference to the drawings. In the drawings mentioned below, components having substantially same functions are shown with same reference symbols for the sake of simplicity of explanation. The present invention is not limited to the embodiments described below.

Embodiment 1

Figure 4:
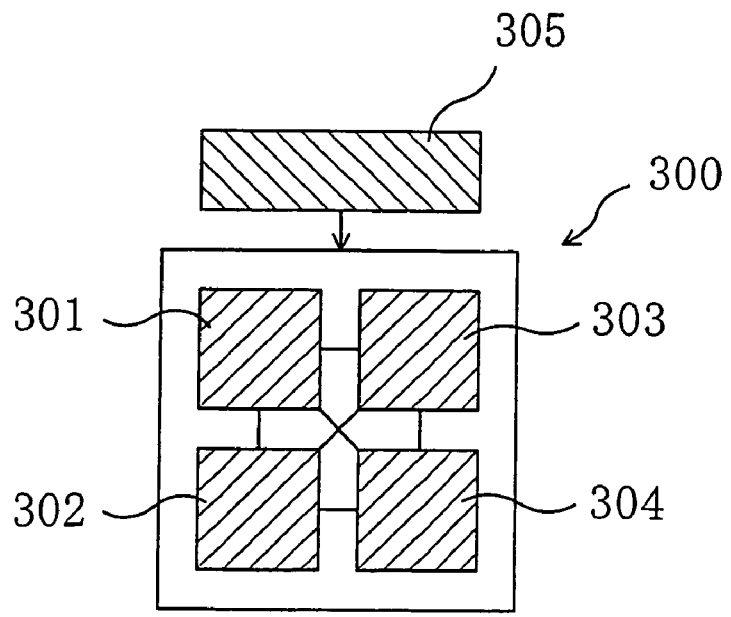
FIG. 4 is a block diagram of a computation circuit 300 devised by the present inventor.

A computation circuit 300 according to the embodiment 1 of the present invention shown in FIG. 4 is constituted by a plurality of specific functional blocks 301, 302, 303 and 304. The specific functional blocks 301, 302, 303 and 304 are interconnected, and receive an instruction from a program portion (realized by software, a ROM or the like) 305 issuing an instruction to determine a combination according to various kinds of applications. According to the instruction from the program portion 305, the specific functional blocks 301, 302, 303 and 304 can dynamically change their combination.

For example, the computation circuit 300 operates with a combination of the specific functional blocks 301 and 302 for the application A, the computation circuit 300 operates with a combination of the specific functional blocks 303 and 304 for the application B, and the computation circuit 300 operates with a combination of the specific functional blocks 301, 302, 303 and 304 for the application C. Here, the specific functional blocks perform parallel processing, and therefore even with a combination of low-performance specific functional blocks, high-performance (e.g. high-speed) computation processing can be performed.

In the configuration shown in FIG. 4, an example of using 4 specific functional blocks as the computation circuit 300 is shown, but the embodiment is not limited thereto, and an unlimited number of specific functional blocks can be added to the computation circuit 300, thus making it possible to boost the capacity in a scalable manner. In other words, if 3 or more specific functional blocks are used as the computation circuit 300, specific functional blocks may be added to achieve a required capacity, and a product for general purpose use can be used for the specific functional block itself, thus making it possible to construct a high-performance computation apparatus at a low cost.

The computation circuit 300 shown in FIG. 4 can be realized by the SoC, but it is attractive to realize the computation circuit 300 by the SiP if considering a practical advantage. Namely, in the case of realization by the SoC, even if the computation circuit 300 is constructed from the specific functional blocks 301, 302, 303 and 304 using general purpose IPs, factors increasing the cost, such as a mask design, are significant for fabricating the computation apparatus 300, and eventually there arises a risk of leading to a product similar to the high-functional module dealing with all the applications.

Figure 5:
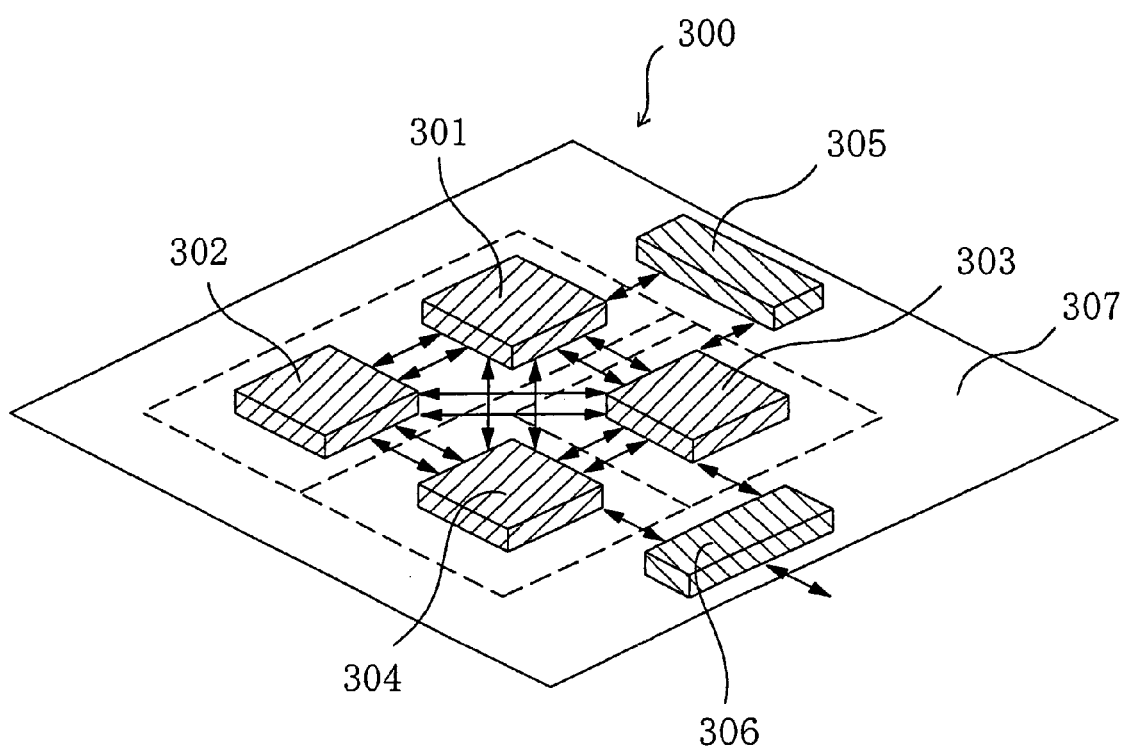
FIG. 5 is a perspective view of the computation circuit 300.

Considering such situations, the inventor devised a configuration as shown in FIG. 5. In the computation circuit 300 shown in FIG. 5, a plurality of chips functioning the specific functional blocks 301, 302, 303 and 304 are packaged on a board 307, and the chips are interconnected. As in the configuration shown in FIG. 4, the combination of chips is determined for each application by the program portion 305, and parallel computation processing can be performed. For the chip, a general-purpose chip (general-purpose LSI chip) may be used. In the example shown in FIG. 5, an external input/output portion (external I/O portion) 306 is provided, and the external I/O portion 306 is connected to a network, thereby allowing bulk data to be directly transmitted. In the configuration shown in FIG. 5, it is only necessary that a plurality of chips functioning as the specific functional blocks 301, 302, 303 and 304 should be chips having an input/output terminal of optical signals, and they may be realized by the SiP or may be realized by the SoC.

The bottleneck here is the speed of transmission between the chips (specific functional blocks) 301 to 304 as described in "Description of the Related Art". If the transmission speed is low, it is eventually difficult to perform high-performance computation processing, and it is also difficult to perform parallel computation processing performed by the chips in cooperation on a real time basis according to various kinds of applications.

Thus, the inventor attempted to apply optical wiring, rather than electrical wiring for use in a normal print board, as wiring establishing connection between the specific functional blocks 301 to 304. By providing optical wiring in the board 307, the speed of transmission between the chips can be enhanced (to, for example, the GHz level). The optical wiring can be formed from an optical transmission line such as an optical fiber or optical waveguide (PLC). In the following description, the "optical transmission line" means a linear member capable of transmitting light.

Figure 6:
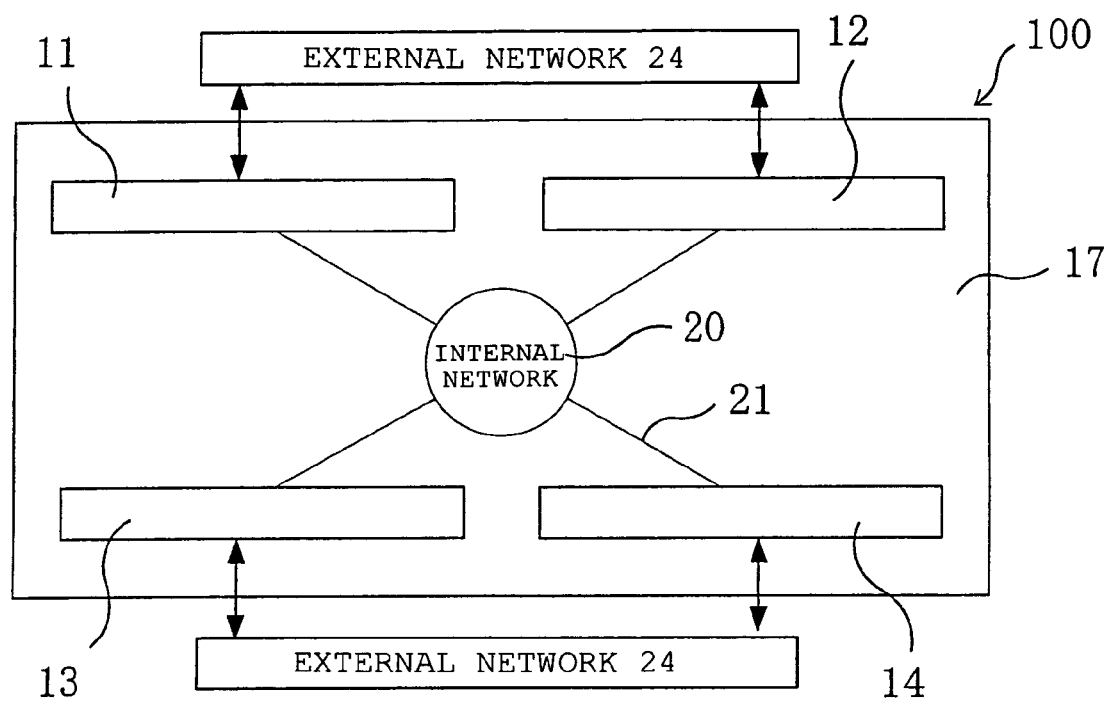
FIG. 6 schematically shows the configuration of a parallel computation apparatus 100 according to an embodiment of the present invention.

The embodiment 1 of the present invention will now be described with reference to FIGS. 6 to 18. FIG. 6 schematically shows a configuration of a parallel computation apparatus 100 according to this embodiment.

The parallel computation apparatus 100 according to this embodiment is a parallel computation system constituted by a plurality of functional modules 11, 12, 13 and 14 mutually optically communicating. The functional modules 11, 12, 13 and 14 each have an optical input/output terminal (not shown) and a computation circuit (not shown) connected to the optical input/output terminal. The optical input/output terminals of the functional modules 11, 12, 13 and 14 are connected to an internal network 20 constituted by an optical transmission line 21, and therefore the functional modules 11, 12, 13 and 14 are optically interconnected via the internal network 20. The parallel computation apparatus 100 corresponds to the multiprocessor of the present invention, and the functional modules 11, 12, 13 and 14 correspond to a plurality of processors of the present invention.

At least one of a plurality of functional modules 11, 12, 13 and 14 has an external terminal (not shown) for establishing connection to an external network 24. The external terminal establishing connection to the external network 24 may be an electrical terminal (electrical signal input/output terminal) or may be an optical terminal (optical signal input/output terminal). For transmitting bulk data, the external terminal is preferably an optical terminal (optical input/output terminal). In the configuration shown in FIG. 6, all the functional modules 11, 12, 13 and 14 have external terminals, and all the functional modules can send and receive data between themselves and the external network 24.

The functional modules 11, 12, 13 and 14 of this embodiment are each constructed with the system-in-package (SiP), and the functional modules 11, 12, 13 and 14 are placed on the board 17. The optical transmission line 21 connecting the functional modules 11, 12, 13 and 14 is placed on the board 17 or so placed as to be included in the board 17. Furthermore, the functional modules 11, 12, 13 and 14 can be so placed as to be included in the board 17.

Figure 7:
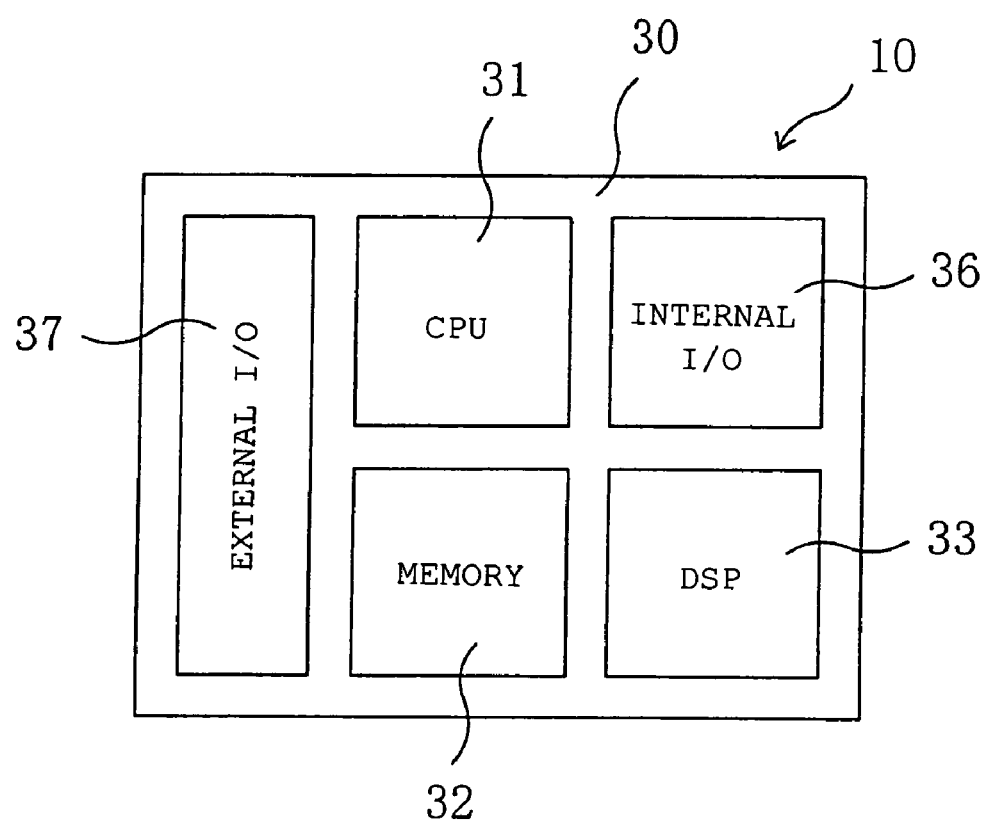
FIG. 7 shows one example in which functional modules 11, 12, 13 and 14 of the embodiment are constructed as system-in-packages (SiPs)

FIG. 7 shows a configuration of the functional modules 11, 12, 13 and 14 of this embodiment as the system-in-package (SiP). This SiP 10 is a SiP (OE-SiP) capable of photoelectric conversion having an optical input/output terminal (optical I/O).

Specifically, the SiP 10 is constituted by an internal input/output terminal (internal I/O) 36 to which the optical transmission line 21 is connected, and a computation processing portion connected to the internal input/output terminal 36. The computation processing portion is constituted by a control portion 31, a storage portion 32, and an application processor portion 33 performing information processing as chips, respectively. The control portion 31 is constituted by a control LSI, and is, for example, a CPU (central processing unit) or MPU (microprocessor unit). The storage portion 32 is a memory (e.g. semiconductor memory capable of high-speed operation (DRAM, SRAM, etc.). The application processor portion 33 is typically a DSP (digital signal processor), and can perform image processing (e.g. dynamic image processing) and voice processing. They work in cooperation to perform computation processing.

The chips constituting the computation processing portion are placed on an interposer 30 to form a SiP (or MCM) configuration, but it is also possible to form a SiP having a stack structure in which some or all of the chips are stacked. The SiP 10 shown in FIG. 7 is provided with an external terminal (external I/O) 37 connected to the computation processing portion, and data can be directly sent to and received from the external network (22) through the external terminal 37. In this embodiment, not the SoC configuration but the SiP configuration is used, but the signal transmission speed is not so low. This is because a signal can be transmitted to the immediate vicinity of the SiP 10 by optical transmission causing less signal degradation, and after photoelectric conversion, an electrical signal can be sent in a wiring length as short as possible, and therefore high-speed transmission is possible even though the SiP configuration is used.

Here, it is also possible to form a configuration in which the control portion 31 and the application processor portion 33 are integrated into one chip. In this case, the chip (LSI chip) has a control function combined with a function performing information processing such as image processing. It is also possible to employ a configuration in which the internal I/O 36 and the external I/O 37 are integrated. It is also possible to place the control portion 31, the application processor portion 33 and the storage portion 32 in one chip, but in this case, the configuration of the system LSI is formed, and therefore the advantage in terms of costs is slightly compromised. It is also possible to enhance the information processing capacity by providing a plurality of DSPs functioning as the application processor 33.

Figure 8:
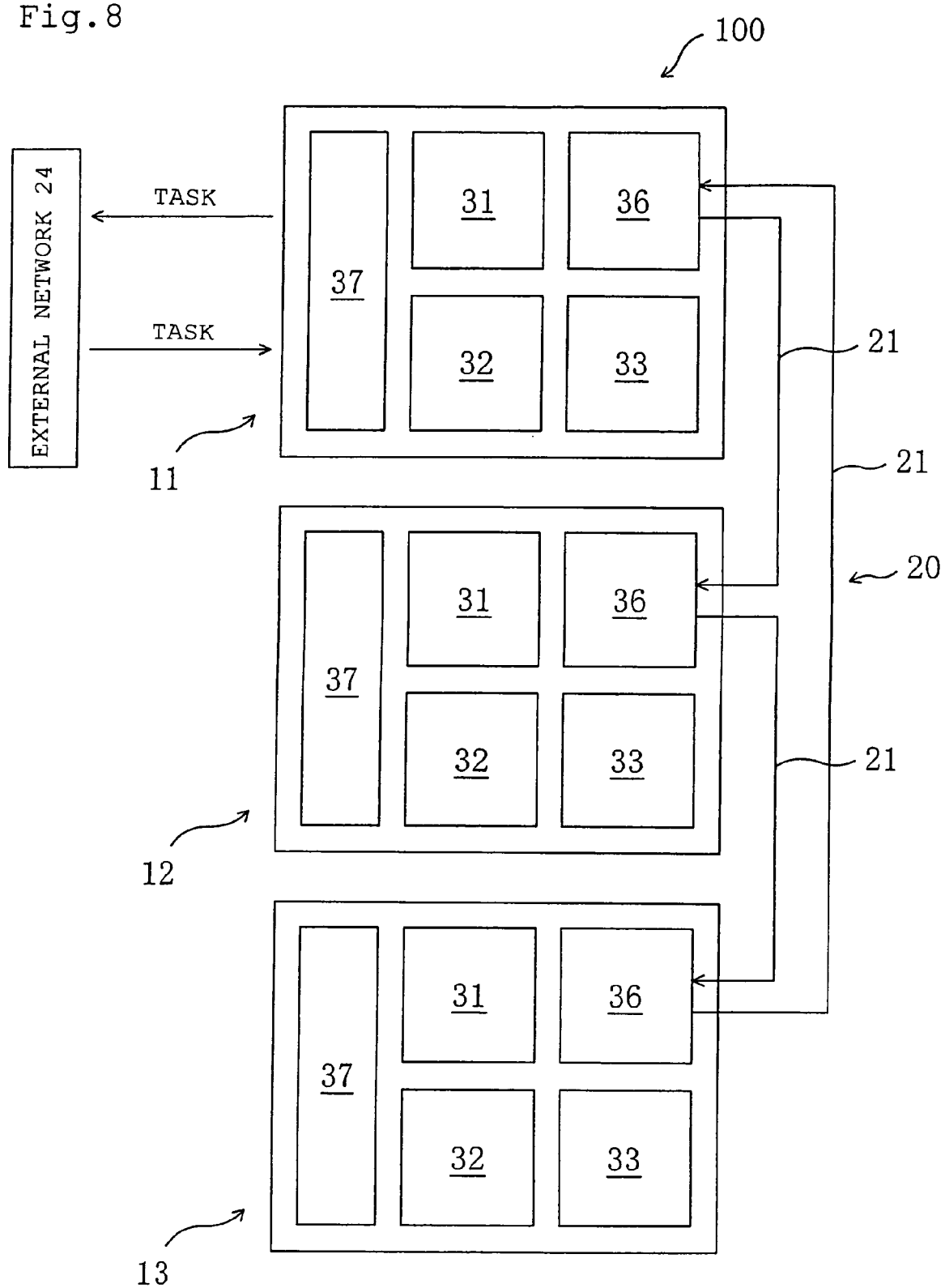
FIG. 8 is a block diagram of the parallel computation apparatus 100 constructed by coupling a plurality of SiPs together.

A configuration in which more than one SiP 10 shown in FIG. 7 is coupled into an optical functional device 100 is shown in FIG. 8. The optical functional device 100 is one example of the parallel computation apparatus 100 shown in FIG. 6, and therefore can be made to perform parallel computation processing. In the configuration shown in FIG. 8, an example of providing 3 functional modules 11, 12 and 13 as the SiP 10 is shown, but 4 SiPs 10 may be provided as shown in FIG. 6, and a larger number of SiPs 10 can be provided.

Here, if a predetermined task is transmitted to the external I/O 37 of a SiP 11 from the external network 24, the functional modules 11, 12 and 13 connected by the optical transmission line 21 can perform computation processing in cooperation, and transmit the result thereof back to the external network 24.

Figure 9:
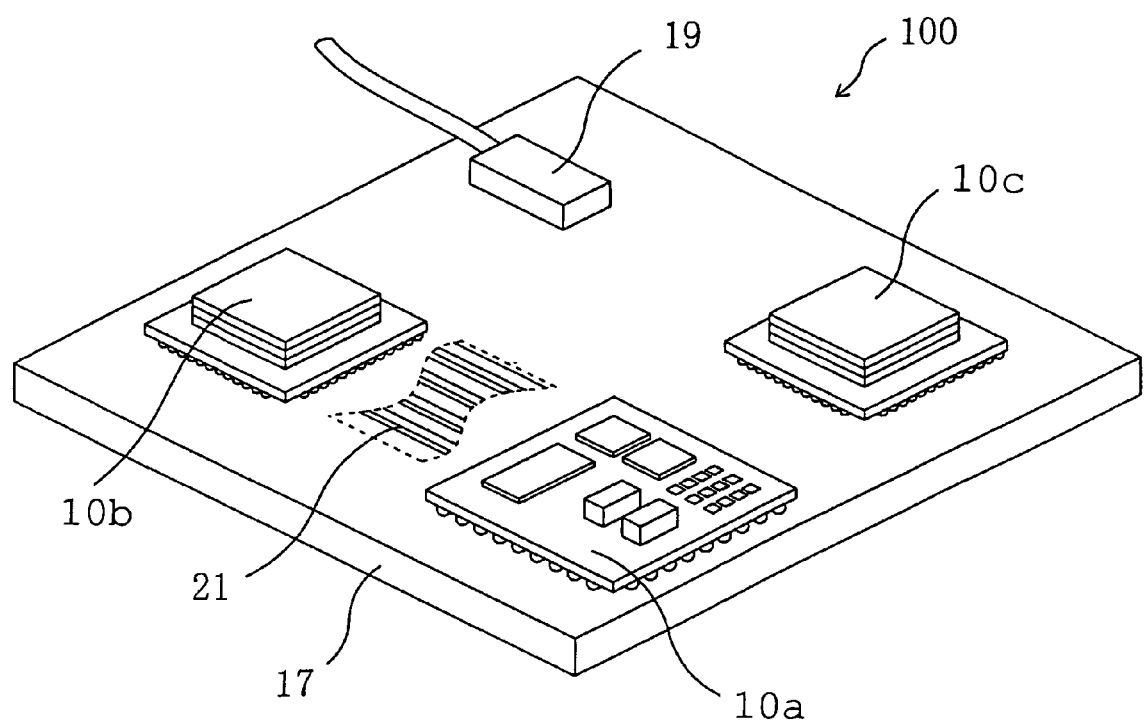
FIG. 9 is a perspective view of the parallel computation apparatus 100.

Next, an example of packaging components to construct the optical functional device 100 is shown in FIG. 9. This will be described in detail below.

The optical functional device 100 shown in FIG. 9 is configured with SiPs 10a, 10b and 10c packaged on the board 17. The board 17 is a photo electric composite board, and represents a board including an optical transmission line. Namely, the optical transmission line 21 constituting an internal network is included in the board 17. An external input/output optical module 19 is connected to the board 17, whereby the board 17 can be connected to the external network 24.

The external input/output optical module 19 can perform a function similar to that of the external I/O of FIG. 7 and the like, and therefore the external I/O 37 may be integrated with the external input/output optical module 19. Of course, it is also possible to employ a configuration in which the external input/output optical module 19 is optically connected to the external I/O 37.

Figure 10:
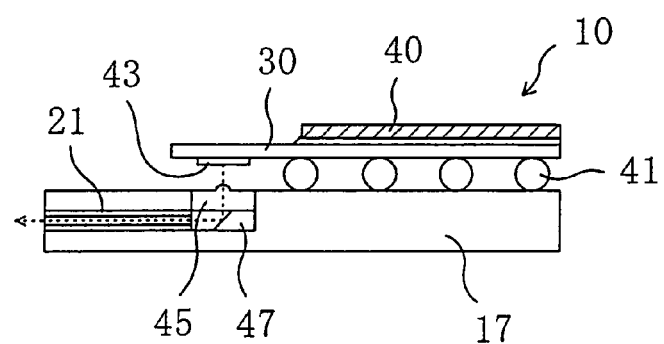

The SiP 10a in FIG. 9 is an optical input/output SiP. A main part of its sectional configuration is shown in FIG. 10. In the SiP 10a, semiconductor elements (logic LSI chip, memory, etc.) are placed on the interposer (intermediate board) 30. In the interposer 30 is formed a connection member (e.g. soldering ball, bump) 41, through which the SiP 10 is packaged into a wiring pattern (not shown) formed on the surface of the board 17.

An electric-optic conversion element (e.g. semiconductor laser) 43 is provided on the back surface of the interposer 30, and light is emitted toward the board 17. In the example shown in FIG. 10, a lens 45 is placed on the surface of the board 17, and a mirror (e.g. 45° mirror) 47 is provided below the lens 45. Light emitted from the electric-optic conversion element (e.g. semiconductor laser) 43 is introduced into the optical transmission line 21 included in the board 17 by the lens 45 and the mirror 47. If a light receiving element (e.g. photodiode) is used as the electric-optic element 43 in a similar configuration, light emitted from the optical transmission line 21 can be made to enter the light receiving element. Namely, in this configuration, an optical signal can be sent and received.

The SiP 10b shown in FIG. 9 is an optical input/output SiP as in the case of the SiP 10a, but more particularly has an optical input/output three-dimensional SiP configuration. Namely, a plurality of chips are stacked to form a three-dimensional structure, and the SiP has a small packaging area because the stacked structure is employed. The SiP 10b may employ the configuration shown in FIG. 10 for the area other than the area having a stacked configuration, and can be optically connected to the optical transmission line 21 as in the example of the configuration shown in FIG. 10. In the SiP 10a shown in FIG. 9, not only the semiconductor element 40 but also other electronic components such as passive components are included on the interposer 30. Of course, in the SiP 10b, other electronic components such as passive components may be mounted on the interposer 30 or chip.

The SiP 10c shown in FIG. 9 has a configuration and a function similar to those of the SiP 10b shown in FIG. 9.

A configuration of an optical signal portion of the optical functional device 100 of this embodiment will now be described with reference to FIGS. 11 to 13.

Figure 11:
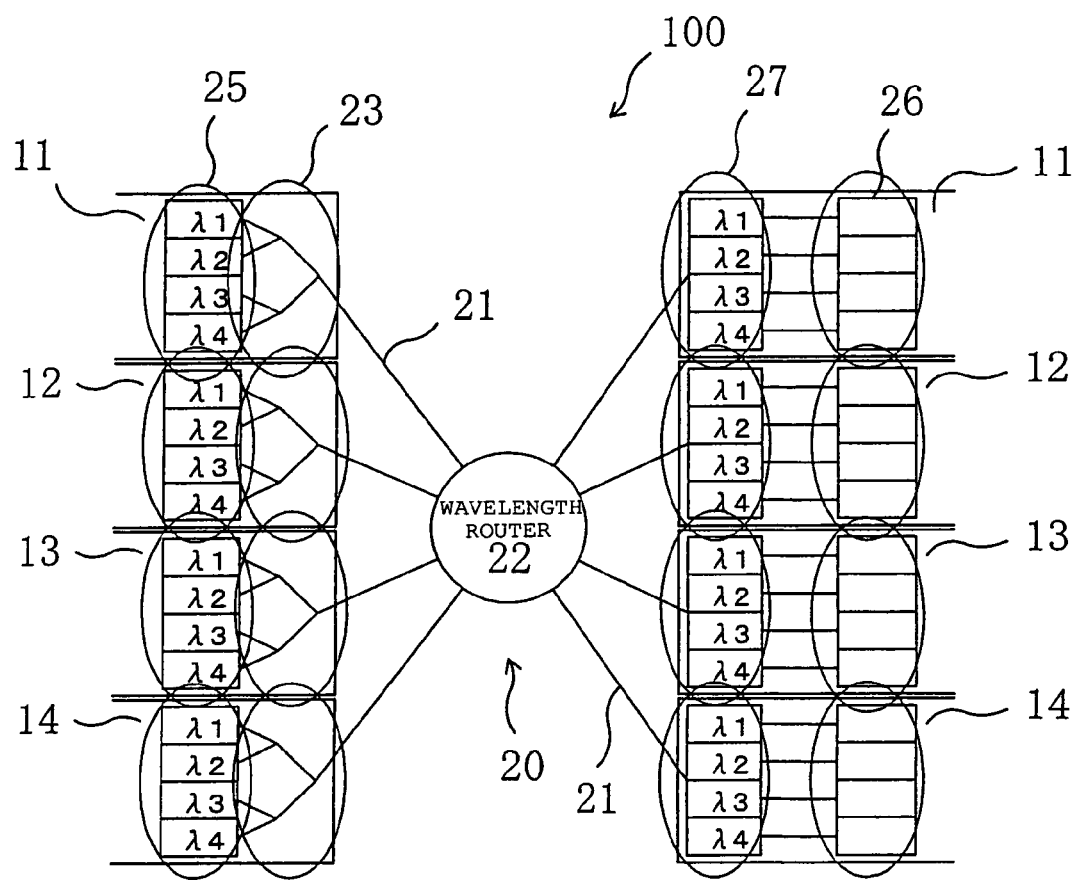
FIG. 11 schematically shows the configuration of an optical functional device 100 of the embodiment.

FIG. 11 shows the internal network 20 and a site which is connected to the internal network 20 in the optical functional device 100 of this embodiment.

The internal network 20 is constituted by a wavelength router 22 and the optical transmission line 21 extending from the wavelength router 22. The SiPs 11, 12, 13 and 14 each have a laser element 25 emitting light, and a wavelength multiplexer 23 multiplexing light from the laser element 25 on the optical output side, and also have a filter 27 and a light receiving element 26 on the optical input side.

In FIG. 11, for the sake of clarity, one optical input/output SiP is divided into a part on the optical output side and a part on the optical input side, and the part on the optical output side is shown on the left side and the part on the optical input side is shown on the right side. In fact, the part on the left side and the part on the right side are joined together, and the optical input portion and the optical output portion are placed on one SiP. If it is matched with the configuration shown in FIG. 7, the internal input/output terminal (internal I/O) 36 in FIG. 7 is constituted by the laser element 25, the wavelength multiplexer 23, the filter 27 and the light receiving element 26 in FIG. 11.

The laser element 25 is, for example, a semiconductor laser, and is configured to be capable of emitting light of multiple wavelengths. In this embodiment, as the semiconductor laser 25 capable of emitting light of multiple wavelengths, an optical transmission array element capable of emitting wavelengths different in light emission points is used, and this can be constructed using, for example, a VCSEL (vertical cavity surface emitting laser). Of course, a plurality of semiconductor lasers each emitting light of a different wavelength may be arranged. It is also possible to use a wavelength variable laser element as the laser element 25. In this case, the wavelength multiplexer 23 is essentially unnecessary. Namely, as the laser element 25, the wavelength variable element may be used, or a plurality of laser elements emitting light of mutually different wavelengths may be used.

The laser element 25 is electrically connected to the computation processing portion (not shown), an electrical signal from the computation processing portion is subjected to electric-optic conversion at the laser element 25, and the resultant optical signal is sent to the wavelength multiplexer 23. The optical signal multiplexed by the wavelength multiplexer 23 is sent to the wavelength router 22 through one optical transmission line 21.

The wavelength router 22 has a plurality of input ports (four in FIG. 11) and a plurality of output ports (four in FIG. 11), and has a function of outputting light to any one output port uniquely determined according to the wavelength of light input to any one input port. In other words, this wavelength router 22 is a device in which the output port is fixedly determined on a one-to-one basis depending on which input port light of which wavelength is input to, and a control signal for routing is not input from outside. Details of the wavelength router 22 will be described later. Light output from the output port of the wavelength router 22 is sent through the optical transmission line 21 to the light receiving element 26 from the filter 27 constituting the optical input portion of each SiP.

The filter 27 in the optical input portion is a wavelength demultiplexer filtering multiplexed light of multiple wavelengths into light of a predetermined wavelength. For the filter 27, a fiber grating and a dielectric a multilayer film filter of which the wavelength separation resolution is improved by increasing the number of film layers can be used. In this embodiment, a dielectric multilayer film filter is used as the filter 27, wherein an organic material film is designed so that crosstalk between terminals is sufficiently separated so that each filter allows only an optical signal of a wavelength $\lambda i$ (i=1 to m (m: any integer number)) to pass with the wavelength corresponding to, for example, a wavelength of several tens nm of the optical signal while the passage region has a loss flattened over a certain range from the central wavelength.

The light receiving element 26 is, for example, a photodiode, where a light signal passing through the filter 27 is converted into an electrical signal. The light receiving element 26 is electrically connected to the computation processing portion (not shown), and the electrical signal is processed in the computation processing portion.

In this embodiment, a full mesh type array waveguide is used as the wavelength router 22. An example of the configuration thereof is shown in FIG. 12. The configuration of the wavelength router 22 being a full mesh type array waveguide is shown in FIG. 13.

Figure 13:
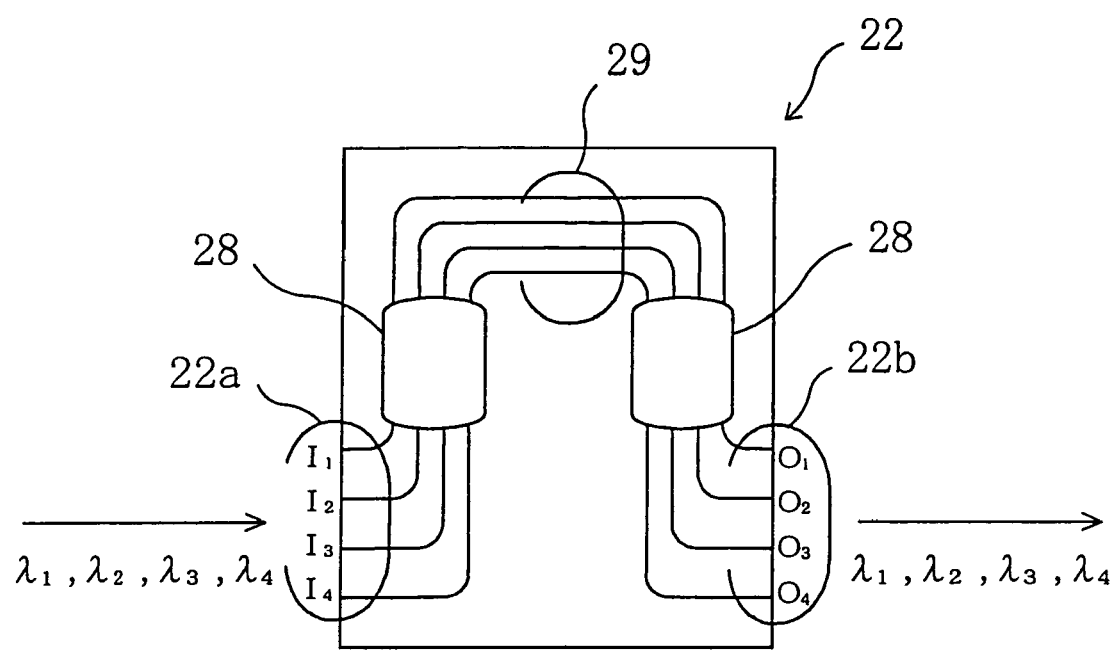
FIG. 13 shows the configuration of a full mesh type array waveguide 22.

The wavelength router 22 shown in FIG. 13 is constituted by a plurality of input waveguides 22a (input ports; I1, I2, I3 and I4), a plurality of output waveguides 22b (output ports; O1, O2, O3 and O4), slab waveguides 28, and array waveguides 29 each having a different waveguide length.

According to this wavelength router 22, the output ports (O1, O2, O3 and O4) can be uniquely determined by the relation between the input ports (I1, I2, I3 and I4) and the wavelengths ($\lambda 1$, $\lambda 2$, $\lambda 3$ and $\lambda 4$) of light input entering the input ports, and in this embodiment, a design is made as shown in Table 1, for example.

TABLE 1

|  | O1 | O2 | O3 | O4 |
| --- | --- | --- | --- | --- |
| I1 | $\lambda 1$ | $\lambda 2$ | $\lambda 3$ | $\lambda 4$ |
| I2 | $\lambda 2$ | $\lambda 3$ | $\lambda 4$ | $\lambda 1$ |
| I3 | $\lambda 3$ | $\lambda 4$ | $\lambda 1$ | $\lambda 2$ |
| I4 | $\lambda 4$ | $\lambda 1$ | $\lambda 2$ | $\lambda 3$ |

According to the design of Table 1, for example, if light of the wavelength $\lambda 1$ is input to the input port I1, the light ($\lambda 1$) is output to the output port O1. If light of the wavelength $\lambda 2$ is input to the input port I3, the light ($\lambda 2$) is output to the output port O4. A mechanism of switching of this wavelength router 22 is disclosed in, for example, Japanese Patent Laid-Open No. 10-200540 and Japanese Patent Laid-Open No. 10-243424, and therefore details thereof are not described, but 4×4 switching of the wavelength router will be briefly described below.

Here, a design is made so that if an optical signal of a wavelength $\lambda k$ (k=1 to 4) is input to an input port I1 (i=1 to m), switching is made to an output port O (k−i) mod 4. The "x mod y" represents a residual obtained by dividing x by y. In this way, the full mesh type array waveguide 22 has an input/output characteristic shown in Table 1, and for example, if multiple wavelength light of $\lambda 1$ to $\lambda 4$ is input to the input port I2, the optical signal of the wavelength $\lambda 1$ is output to the output port O3, and light of the wavelength $\lambda 4$ is output to the output port O2.

The optical functional device 100 of this embodiment is constituted by system-in-packages 11, 12, 13 and 14 including a computation processing portion (control portion 31, storage portion 32 and application processor portion 33) and an optical input/output portion (laser element 25, wavelength multiplexer 23, filter 27 as wavelength demultiplexer, and light receiving element 26), and the system-in-packages 11, 12, 13 and 14 are interconnected via the wavelength router 22 by the optical transmission line 21. Thus, the optical functional device 100 is characteristic in that optical switching processing and parallel computation processing can be performed without controlling system-in-packages 10 in synchronization by a specific control circuit. In addition, the optical functional device 100 is characteristic in that because the optical functional device 100 is constructed with a plurality of system-in-packages 10, additional provision of the application processor portion 33 (e.g. DSP, etc.) or the like is easy, and it is excellent in applicability and extensibility.

Figure 14:
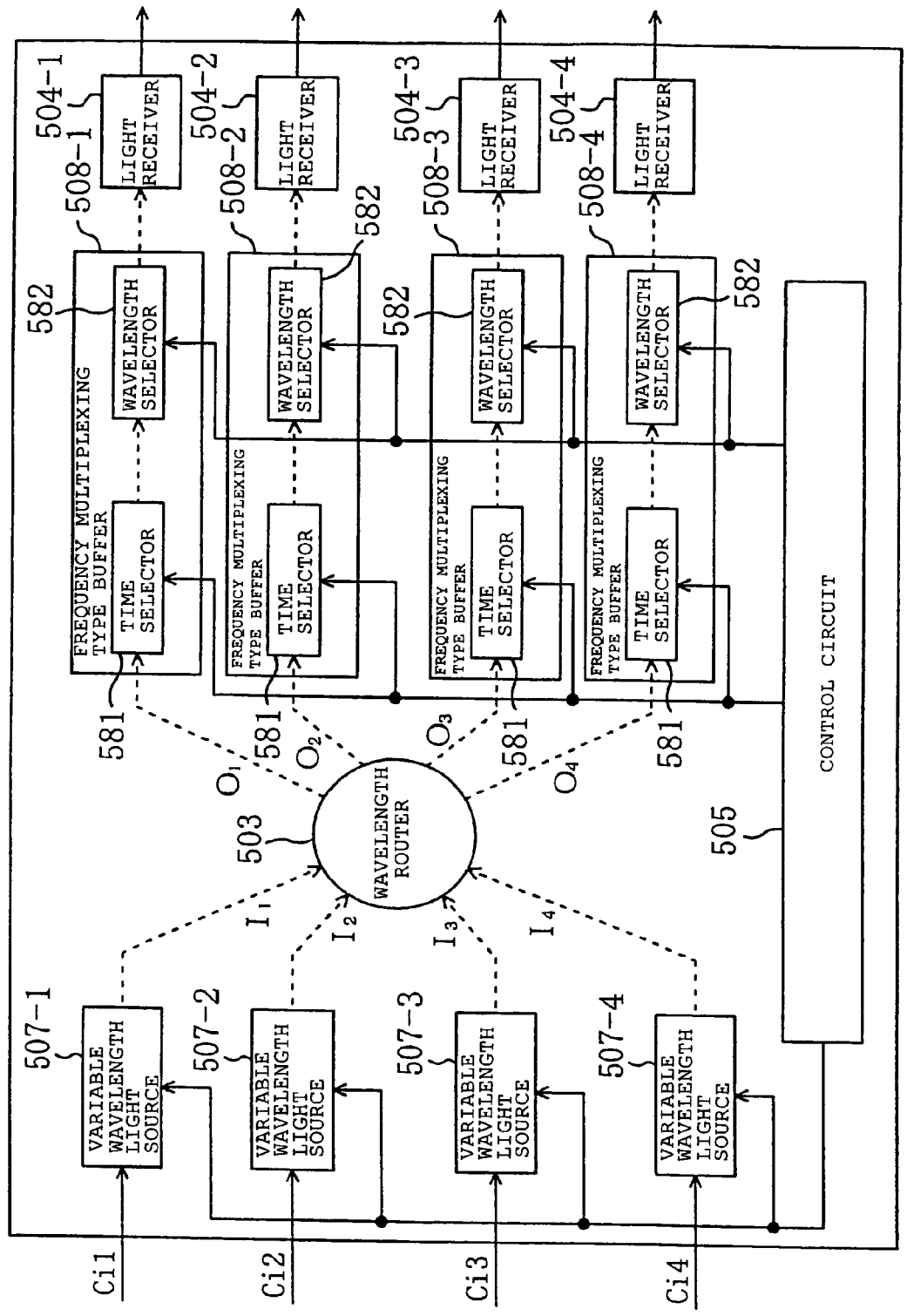
FIG. 14 shows the configuration of a conventional optical switch.

For comparison with the optical functional device 100 of this embodiment, an optical switch using a conventional optical wavelength switching system will now be described. FIG. 14 is a block diagram showing a concept of the configuration of the optical switch disclosed in Japanese Patent Laid-Open No. 10-200540. The optical switch 500 shown in FIG. 14 is one switching device in which elements are not separable, and has a configuration which is essentially different from that of the optical functional device 100 consisting of a plurality of SiPs like the configuration of this embodiment.

The optical switch 500 shown in FIG. 14 is constituted by a plurality of variable wavelength light sources 507, a wavelength router 503, a plurality of frequency multiplexing type buffers 508, a plurality of light receivers 504, and a control circuit 505 controlling the variable wavelength light sources 507 and the frequency multiplexing type buffers 508.

Each variable wavelength light source 507 outputs a wavelength consistent with a signal from the control circuit 505. The wavelength router 503 sorts optical cells sent from the variable wavelength light sources 507 and sends the same to the respective frequency multiplexing type buffers 508. The control circuit 505 sends signals to the variable wavelength light sources 507, time selectors 581 and wavelength selector 582. The time selectors 581 of the wavelength multiplexing type buffers 508 performs time separation of optical cells according to signals from the control circuit 505. The wavelength selectors 582 of the frequency multiplexing type buffers 508 perform wavelength separation of optical cells according to signals from the control circuit 505. The light receivers 504 convert optical cells sent from the frequency multiplexing type buffers 508 into electrical signals and output the electrical signals.

Assume that data containing a certain destination address is now transmitted from outside the optical switch 500 to anyone of input ports Ci1 to Ci4. The transmitted data signal is an electrical signal. When an optical signal is transmitted from an external apparatus, the optical signal is converted into an electrical signal by performing photoelectric conversion. After the optical signal is converted into the electrical signal, the destination address contained in the data is identified, and address information is transmitted to the control circuit 505.

The control circuit 505 previously assigns a relation of an optical signal transmitted according to the destination address with a wavelength, and controls the variable wavelength light sources 507-1 to 507-4 so as to output the optical signal at a relevant wavelength from the relation between the destination address and the wavelength. The wavelength router 503 sorts optical signals sent from the variable wavelength light sources 507-1 to 507-4, and then sends the same to the respective frequency multiplexing type buffers 508-1 to 508-4.

The time selectors 581 in the frequency multiplexing type buffers 508-1 to 508-4 perform time separation according to signals from the control circuit 505. The wavelength separators 582 in the frequency multiplexing type buffers 508-1 to 508-4 perform wavelength separation according to signals from the control circuit 505. In this way, the control circuit 505 sends control signals to the time selectors 581 and the wavelength selectors 582. The light receivers 504-1 to 504-4 convert optical signals sent from the frequency multiplexing type buffers 508-1 to 508-4 into electrical signals and output the electrical signals.

The reason why the frequency multiplexing type buffers 508-1 to 508-4 are necessary will now be described. Switching of optical signals converts the wavelength into any wavelength at the variable wavelength light sources 507-1 to 507-4, and therefore a plurality of optical signals may arrive at one output port at the same time. Therefore, time separation is performed by the time selectors 581, wavelength separation is performed by the wavelength selectors 582, and optical signals are separated and output, whereby congestion of data is avoided. For this purpose, the frequency multiplexing type buffers 508-1 to 508-4 are necessary.

The advantage of this optical switch 500 is that it allows construction of an output buffer type switching system capable of achieving a high throughput. However, the frequency multiplexing type optical buffer requires a component equivalent to an expensive optical memory still at a research phase, and it is thus difficult to realize a large-scale optical memory coping with a high-speed transmission signal. Furthermore, a variable wavelength filter is required for wavelength separation, and so on, resulting in increased complication in terms of an apparatus configuration.

Moreover, there are many problems such that high-speed control of output wavelengths of the variable wavelength light sources 507 is required, and the current value and the temperature must be controlled at the same time, and in addition, the optical intensity significantly varies depending on the number of optical signals arriving at the frequency multiplexing type optical buffer, and thus design becomes difficult.

For solving these problems, in the technique of Japanese Patent Laid-Open No. 10-243424, for example, an optical switch is packaged before and after the input/output of the wavelength router to achieve simplification from a functional viewpoint. However, introduction of the optical switch is not preferable because an optical wiring packaging method is complicated, and also an apparatus is complicated because a control circuit of the optical switch is also required.

In the technique of Japanese Patent Laid-Open No. 10-200540, for example, time over which a signal is sent is previously limited based on a time slot for each of certain wavelengths using an optical modulator, whereby simplification is to be achieved. However, this has a disadvantage of adding difficulties in terms of hardware and additionally increasing a loss over apparatus operating time.

According to the optical functional device 100 of this embodiment, an optical switch free from such problems can be constructed. Namely, no frequency multiplexing type optical is necessary, and therefore an optical memory is not required, and further the device can be operated without controlling the system-in-packages 10 in synchronization by a specific control circuit, and therefore high-speed control of output wavelengths of variable wavelength light sources, and the like are not required. Thus, the optical functional device 100 of this embodiment has an advantage that the apparatus structure can be simplified while maintaining high-speed operations.

Figure 12:
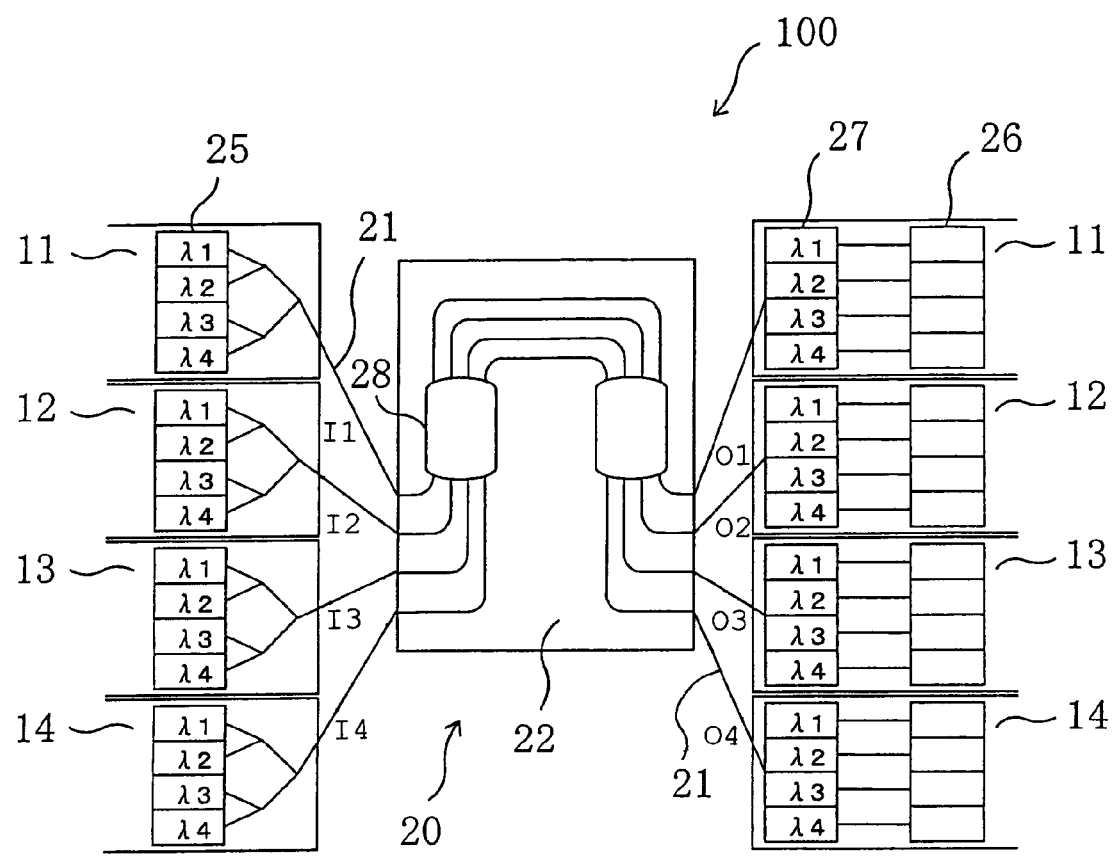
FIG. 12 schematically shows the configuration of the optical functional device 100 of the embodiment.
Figure 15:
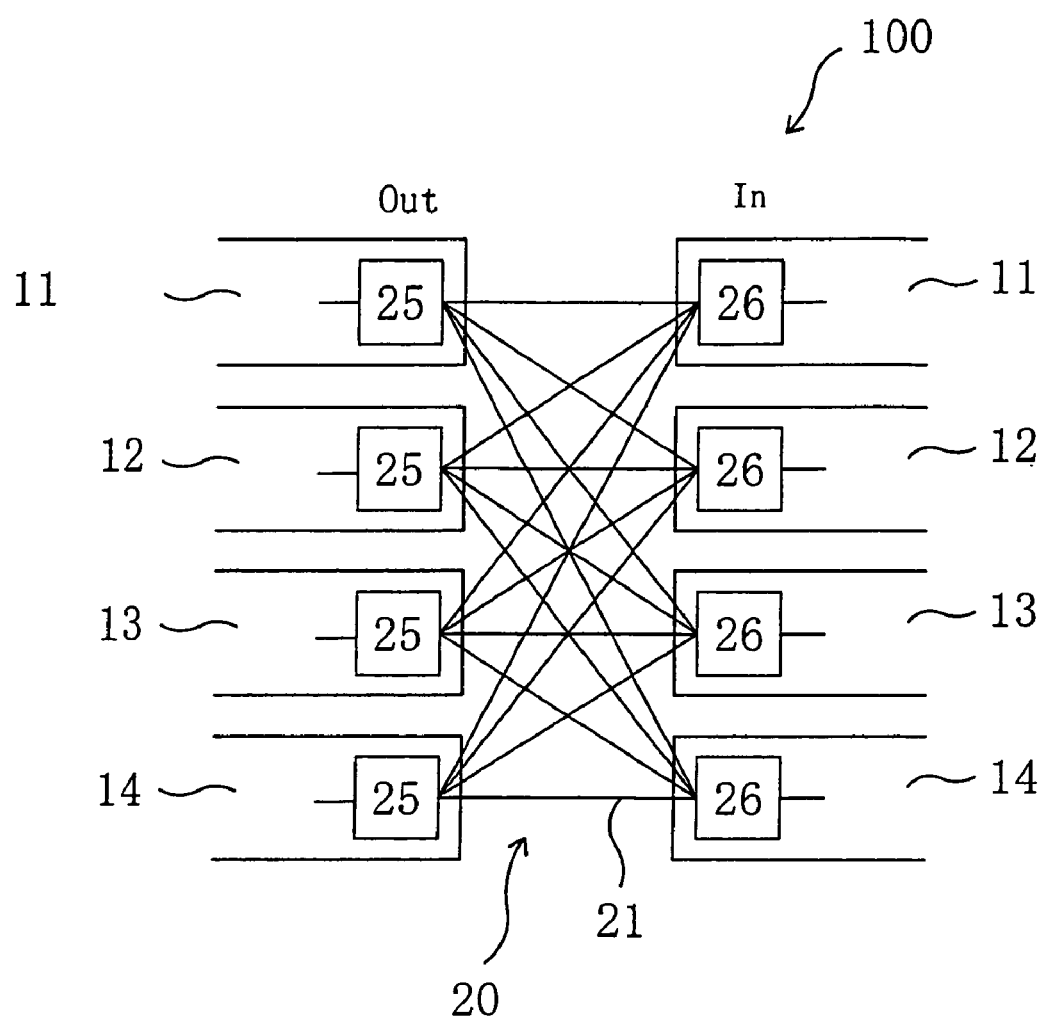
FIG. 15 schematically shows an example of modification of the optical functional device 100 of the embodiment.

Use of the internal network 20 shown in FIG. 15 in which the internal input terminals of the SiPs 11, 12, 13 and 14 are connected to the optical output terminals of any other SiPs via the optical transmission line 21 leads to a configuration in which all the SiPs are directly optically interconnected, thus making it possible to omit the wavelength router 22 from the configuration shown in FIG. 12. In the configuration shown in FIG. 15, the filter 27 is also unnecessary. Namely, in the example shown in FIG. 15, sine the SiPs 10 are directly optically interconnected and optical signals are not multiplexed, the wavelength router 22 and the filter 27 can be omitted, and resultantly a simple configuration can be realized.

However, if the number of SiPs increases, the number of optical transmission lines 21 interconnecting the SiPs considerably increases, and therefore it is preferable that the configuration shown in FIG. 15 is employed when the number of Sips is small (e.g. 4 or less), and the configuration using the wavelength router 22 shown in FIGS. 11 and 12 is employed when the number of SiPs is large (e.g. 4 or more). However, the determination on whether the number of Sips is large or small varies depending on the amount of space in the apparatus, the transmission speed and optical wiring means, and therefore it is determined based on the specific configuration and conditions of the apparatus. The number of wirings increases by an order of the square of n in the configuration shown in FIG. 15 while the number of wirings increases by an order of 2×n in the configuration shown in FIGS. 11 and 12; therefore, it is desirable to make the determination using the increasing rates as an index.

A method of passing data between the SiPs will now be described. As described above, in the optical functional device 100 of this embodiment, the control circuit 500 in FIG. 14, or the like, is unnecessary, and the SiPs 10 may be operated asynchronously, instead of being operated in synchronization, to perform various kinds of processing (switching processing, etc.). In this embodiment, operating the SiPs 10 in synchronization means that the control circuit generates a common clock signal, and the Sips 10 operate under control of the control circuit according to the common clock signal. In this embodiment, operating the SiPs 10 asynchronously (operating them not in synchronization) means that the SiPs 10 are operated using neither the above-mentioned common clock signal nor the above-mentioned control circuit.

Figure 16:
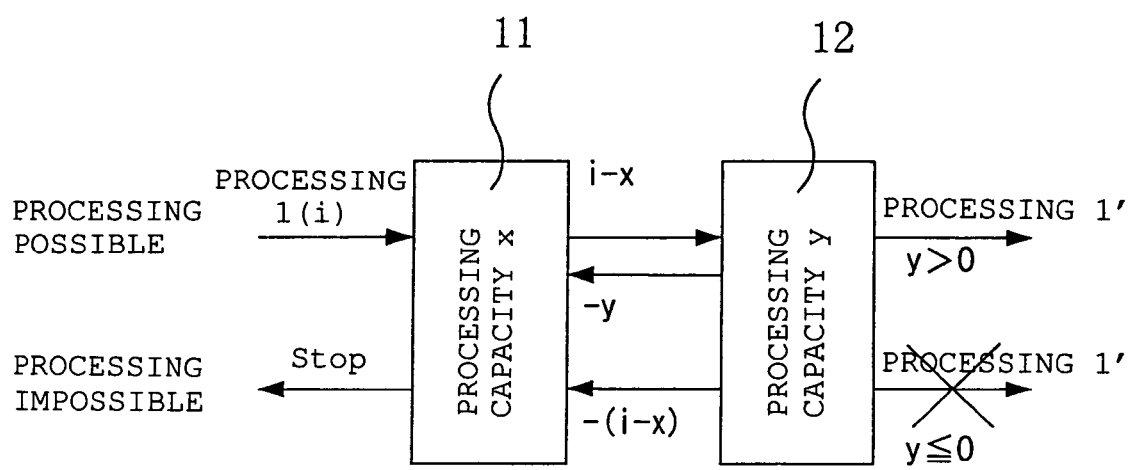
FIG. 16 is a view for explaining a method of passing data between the SiPs 11 and 12.

One example of processing the entire system not in synchronization will now be described with reference to FIG. 16. First, the example will be described focusing on a relation between a SiP 11 having an information processing capacity (hereinafter referred to simply as "processing capacity") x and a SiP 12 having a processing capacity y.

The SiP 11 of this embodiment has a function of determining whether it can complete processing of a processing amount i based on the processing capacity x by itself when processing 1 of the processing amount i is committed. Specifically, the SiP 11 should be provided with a computing element comparing the processing amount i and the processing capacity x. The SiP 11 has a function of outputting a processing amount (i−x) obtained by subtracting an information processing amount based on the processing capacity x from the processing amount i to at least one of SiPs other than the SiP 11, i.e. 12, 13 and 14 if the SiP 11 determines that it cannot complete the above-mentioned processing.

Thus, the SiP 11 is operated alone if the processing amount I in processing 1 is small (e.g. i≦x), and SiPs other than the SiP 11 are additionally operated in cooperation if the processing amount i is large (e.g. i>x), thus making it possible to perform parallel computation. In FIG. 16, an example of outputting from the SiP 11 to the SiP 12 is shown, but it is also possible to employ a procedure of outputting from the SiP 11 to all or any two of the SiPs 12, 13 and 14.

If the processing amount i is defined as a data set showing the amount of information processed and acceptable processing time, and the processing capacity x is defined as the amount of information capable of being processed in a fixed time, actual processing on a time basis can be more accurately reflected. When the processing amount (i−x) obtained by subtracting the information amount based on the processing capacity x from the processing amount i is output to other SiPs 12, 13 and 14, a value of 100% of the value of the processing capacity x is not necessarily subtracted from i, but it is possible to subtract a value less than that (e.g. a value of 90% or 80%) from i and output the obtained value to other SiPs 12, 13 and 14. This is because even if the processing amount processed by the SiP 11 is reduced, processing is not retarded as the entire system if processing can be performed by other SiPs 10. Conversely, if the processing speed of the SiP 11 is noticeably high compared to other SiPs 10, a value of 100% of the value of the processing capacity x is not necessarily subtracted from i, but it is possible to subtract a value slightly exceeding that (e.g. a value of 110% or 120%) and output the obtained value to other SiPs 12, 13 and 14.

In the optical functional device 100 of this embodiment, the SiPs 11, 12, 13 and 14 are optically connected, and therefore the speed of data transmission between the SiPs is considerably improved, thus making it possible to prevent a situation in which the speed of transmission between the SiPs 10 is limited in computation processing. Further, a specific example will be described below.

First, the input port in charge of sending certain signals is provided with a counter A for the processing amount and a counter B for the data amount. The SiP 12 in charge of receiving certain signals is provided with an electrical memory buffer.

Now, if processing 1 having the processing amount i is committed, the SiP11 (processing capacity x) receiving it determines whether processing will be completed by its own processing capacity. If the processing cannot be completed in the SiP 11, an initial value is specified as "i", and at the time of sending data to the SiP 12, a counter is set at "i−x", i.e. decremented by x.

In the SiP 12, when a signal is received from the SiP 11, a counter amount y is sent to the siP 11 as a reception confirmation signal at the time of completion of the reception if the SiP 12 can perform processing by itself. When the SiP 11 receives this signal, the SiP 11 sets the counter at −y, i.e. decrements the counter by y.

In the SiP 12, when the signal is received, a counter amount −(i−x) is sent to the sender using y as a reception confirmation signal at the time of completion of the reception if processing cannot be performed by its own system. When the SiP 11 received this signal, it stops sending to the SiP 12.

If it is proved that sending is possible in the above-mentioned means, then the initial value of the counter B for the data amount provided in the SiP 11 is set to 0. When data is sent, the counter B is set at +1, i.e. incremented by 1. On the SiP 12 side, when the signal is received, a reception confirmation signal is sent to the sender at the time of completion of the reception. At this time, the counter B is set to −1, i.e. decremented by 1.

By this procedure, the data amount of the electrical buffer of the SiP 12 is monitored and compared with a threshold, and sending is stopped if the data amount coincides with the threshold, i.e. at counter=threshold 1 (y). After the memory in the buffer is sent, data is sent again at counter<threshold 2. By this procedure, congestion of data can be monitored.

Thus, use of such a system allows the processing procedure to be followed without synchronizing the entire system, and resultantly the utilization efficiency of the same network can be improved.

Figure 17:
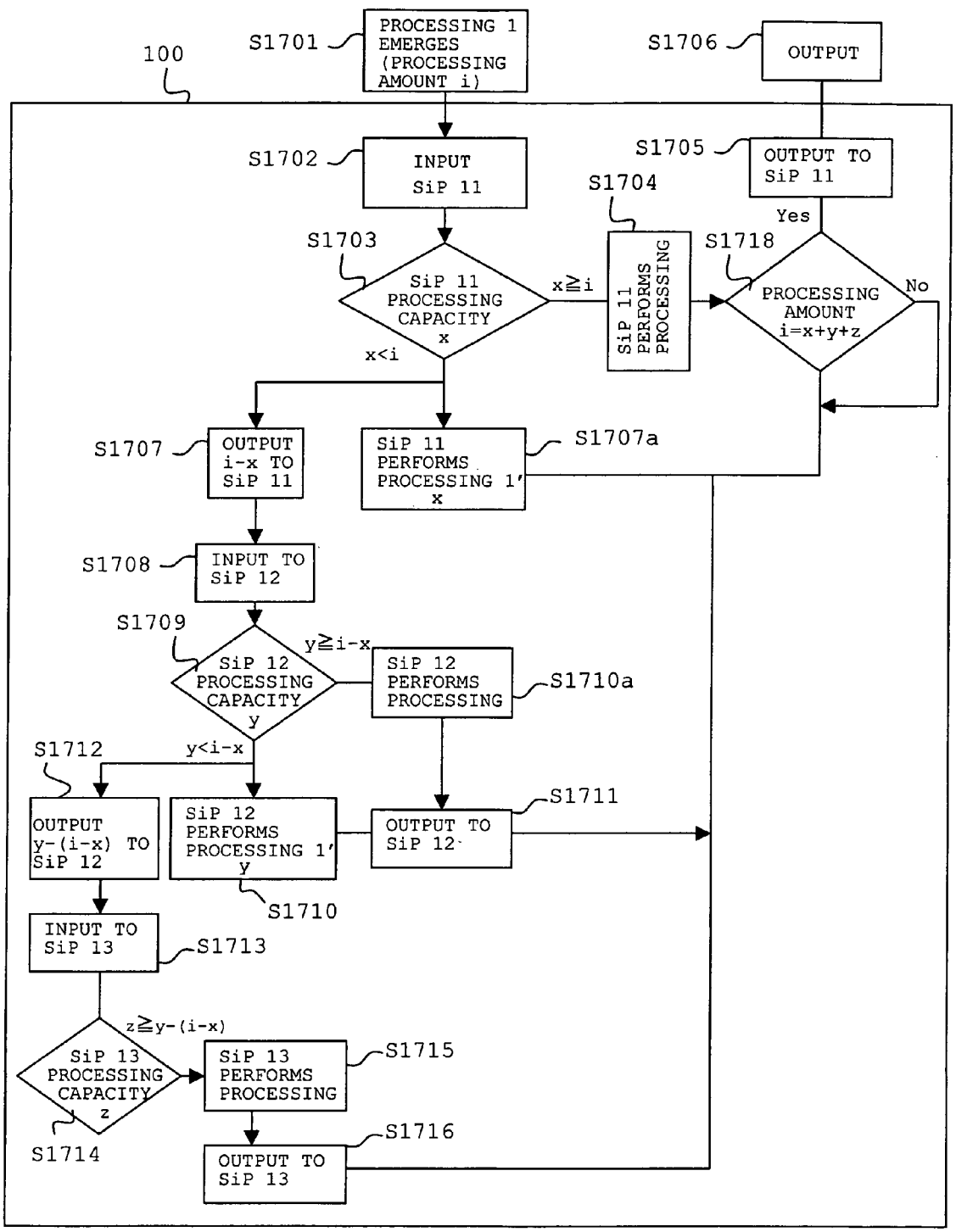
FIG. 17 is a flowchart for explaining an information processing method according to the embodiment of the present invention.
Figure 18:
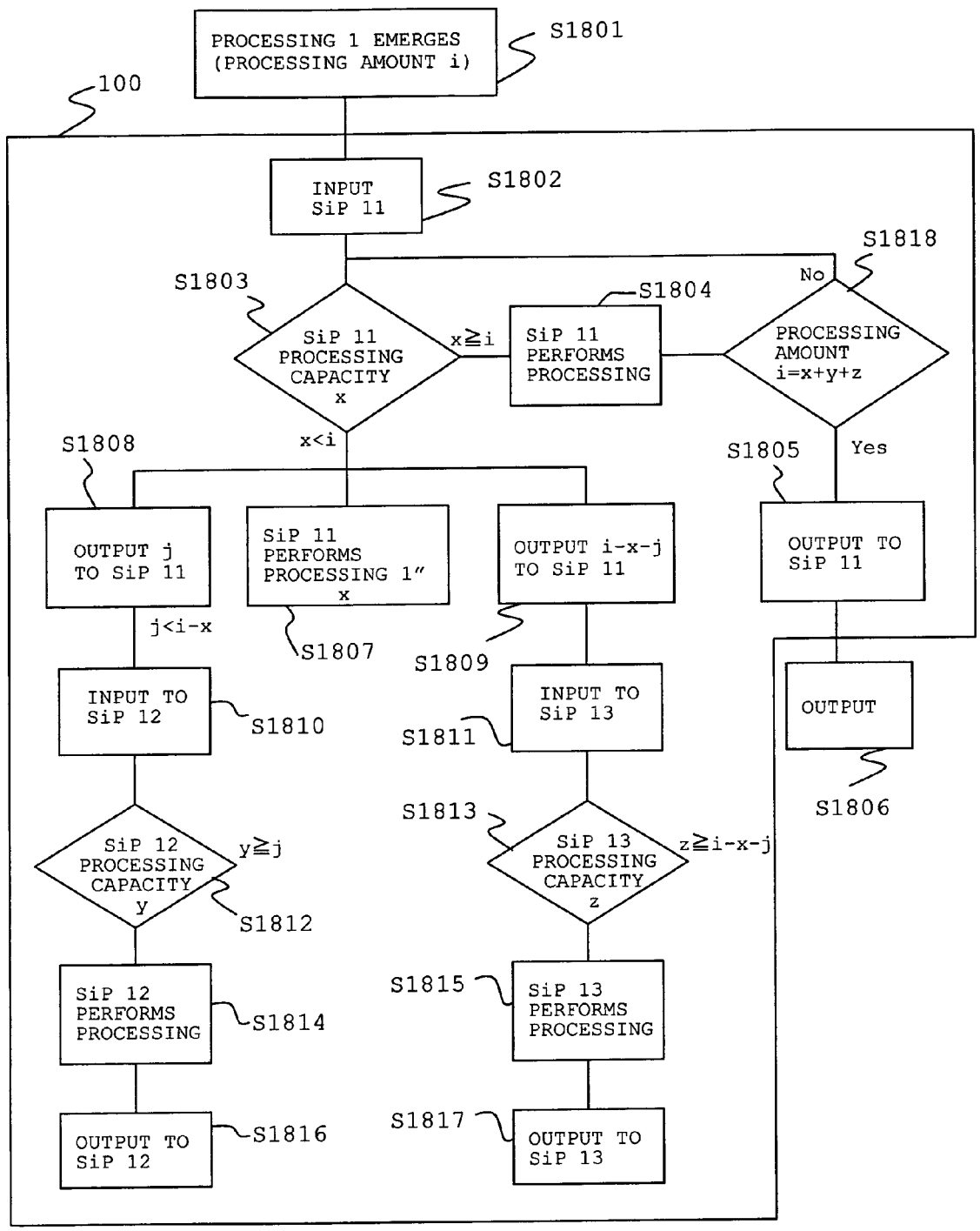
FIG. 18 is a flowchart for explaining the information processing method according to the embodiment of the present invention.

An information processing method in a configuration with 3 or more SiPs will now be described with reference to FIGS. 17 and 18. FIG. 17 shows a system in which the SiP 11 is provided upstream, and data is passed therefrom to the SiP 12 and subsequent SiPs downstream whenever necessary. FIG. 18 shows a system in which data is passed with the SiP 11 provided upstream and branched into the SiP 12 and SiP 13 as tributaries. Both the systems will be described using as an example the configuration with 3 or more SiPs, but the basic principle is same for 4 or more sips. For both the systems, processing can be made to proceed with the SiPs 10 operated asynchronously.

First, the information processing method shown in FIG. 17 will be described.

First, processing 1 of the processing amount i emerges (S1701) and is input to the SiP 11 (S1702).

Then, the SiP 11 determines whether processing 1 of the processing amount i can be completed based on the processing capacity x (S1703). If the SiP 11 can perform processing 1 of the processing amount i by itself based on the processing capacity x (x≧i), the SiP performs the processing (S1704), and outputs the same (S1705) and outputs the same (S1706).

If the SiP 11 determines that it cannot complete processing 1 of the processing amount i based on the processing capability x (x<i), the SiP 11 outputs the processing amount (i−x) as processing 1' to the SiP 12 having a processing capacity y (S1707). At the same time, the SiP 11 processes the processing amount x of processing 1 based on the processing capacity x (S1707a). Then, output is left on standby until processing of processing 1' is completed by a group of other SiPs.

After it is input to the SiP 12 (S1708), the SiP 12 determines whether it can complete the processing amount (i−x) of processing 1' based on the processing capacity y (S1709).

If the SiP 12 can process the processing amount (i−x) of processing 1' by itself (y≧i−x), it outputs the counter amount y to the SiP 11 as described previously, and the SiP 11 decrements the counter amount of the counter A by y (S1710). At the same time, the SiP 12 performs processing (S1710a), outputs the same (S1711), and combines it with processing of the SiP 11 (i=x+y) and outputs the same to outside (S1706).

Further, the SiP 12 determines that it cannot complete processing of the processing amount (i−x) of processing 1' based on the processing capacity y (y<i−x), the SiP 12 outputs the processing amount y−(i−x) as processing 1" to the SiP 13 having a processing capacity z (S1712). At the same time, the SiP 12 processes the processing amount y of processing 1' based on the processing capacity y. Then, the result of processing of the processing amount y is output to the SiP 11.

After it is input to the SiP 13 (S1713), the SiP 13 determines whether it can complete processing 1" of the processing amount y−(i−x) based on the processing capacity z (S1714). If the SiP 13 can perform processing 1" of the processing amount y−(i−x) by itself based on the processing capacity z (z≧y−(i−x)), it outputs the counter amount y to the SiP 11 as described previously, and the SiP 11 decrements the counter amount of the counter A by z. At the same time, the SiP 13 performs processing (S1715), outputs the same, and outputs the same to outside if the processing amount combined with those of processing of the SiP 11 and SiP 12 is the processing amount i=x+y+z (S1718), and loops S1718 otherwise.

If the SiP 13 determines that it cannot complete processing, processing is undertaken by the SiP 14 if it exists. If SiP 14 does not exist, processing is performed such that the processing amount i−(x+y+z) is input to the SiP 11 again. Here, if a group of SiPs having a plurality of internal networks exists in the external network, the SiP 11 commissions a group of other SiPs to perform processing according to the procedure described previously. The group of SiPs here has one or more SiP.

The SiP 11 ensures that the processing amount i of processing 1 has been all completed, i.e. when the counter A turns zero, the SiP 11 performs output to the commissioned external network.

The information processing method shown in FIG. 18 will now be described.

As in FIG. 17, first, processing 1 of the processing amount i emerges (S1801) and is input to the SiP 11 (S1802). Then, the SiP 11 determines whether it can complete processing 1 of the processing amount i by itself (S1803), and if it can perform processing 1 (x≧i), the SiP 11 performs processing (S1804), and outputs the same (S1805) and outputs the same (S1806).

If the SiP 11 determines that it cannot complete processing 1 of the processing amount i (x<i), the SiP 11 specifies processing equivalent to the processing amount x as processing 1" and performs processing (S1807) Parallel to S1807, the SiP 11 outputs part (j) of the processing amount (i−x) to the SiP 12 (S1808), and outputs to the SiP 13 a residue (i−x−j) after subtracting the part (j) from the processing amount (i−x) (S1809). In this procedure, it is preferable that the processing amount (i−x−j) is defined so that processing time is the minimum.

Then, the processing amount j and the processing amount i−x−j are input to the SiP 12 and the SiP 13, respectively (S1810, S1811), and compared with their respective processing capacities (S1812, S1813), and if the processing capacities y and z are equal to or greater than the processing amounts j and i−x−j, respectively, as a result of the comparison, the SiP 12 and the SiP 13 each perform processing (S1814, S1815), and output the same (S1816, S1817). The SiPs send their respective processing amounts to the counter A of the SiP 11, and after the SiP 11 ensures that the processing amount i of processing 1 has been all completed, i.e. when the counter A turns zero, the SiP 11 performs output to the commissioned external network (S1818).

Only the case where processing can be completed by 2 SiPs, i.e. the SiP 12 and SiP 13 is shown in S1814 and S1815 of FIG. 18, but if processing can not be completed, the SiP 11 outputs the remaining processing amount (i−x−y−z) to the SiP 14 in parallel if the SiP 14 exists. In this system, the SiP 11 preferably recognizes (or stores) the processing capacities y and z of the SiP 12 and SiP 13 in addition to its own processing capacity x. For the same reason, the SiP 11 preferably recognizes (or stores) the processing capacity of the SiP 14 as well when the processing amount is very large. As in the information processing method of FIG. 17, processing is performed such that the processing amount of i−(x+y+z) is input to the SiP 11 again if the SiP 14 does not exist. Here, a group of SiPs having a plurality of internal networks exists in the external network, the SiP 11 commissions a group of other SiPs to perform processing in the same manner as in the procedure described previously. The group of SiP here has one or more SiP.

According to the information processing method of this embodiment, processing can be completed by one SiP 11 when the information processing amount (i) is small, and computation processing can be accomplished in parallel by a plurality of SiPs 11, 12 and 13 in cooperation when the information processing amount (i) is large. An information processing method having a high degree of freedom can be realized.

The conventional parallel computation processing employs a system in which a circuit configuration is predetermined so that a solution can be obtained for a certain application with optimum efficiency, and therefore it is not flexible processing like the method of this embodiment, and has a low degree of freedom accordingly. In the information processing method of the present invention, SiPs 10 can be further added to improve the processing capacity, and even if so doing, the basic processing method (basic concept) does not change, and therefore the method is rich in applicability or extensibility. Namely, in the conventional parallel computation processing, it is necessary to predetermine a circuit configuration again so as to obtain a solution with optimum efficiency when a circuit component is added, but in the method of this embodiment, processing shown in, for example, FIG. 17 or 18 is performed, and there is no necessity to make such a determination, or little such necessity if any.

In the embodiment 1 described above, the example of operating a plurality of SiPs asynchronously is often shown, but they can be operated in synchronization. If the optical functional device 100 is operated as an optical switching system, in the configuration shown in FIG. 11, newly providing a control circuit (see "control circuit 505" of FIG. 14) to synchronize the SiPs does not seem very advantageous, but control portions (e.g. "31" of FIG. 8) in computation processing portions can be synchronized to construct the computation circuit 300 described with FIGS. 4 and 5. Namely, a control circuit capable of determining a combination of SiPs 11, 12, 13 and 14 for each application by the program portion 305 and performing parallel computation processing by the combination of SiPs can be constructed. The speed of transmission between the SiPs 10 is extremely high compared to electrical wiring, and therefore parallel computation processing carried out by making the SiPs 10 work in cooperation in real time can be performed. It is possible to determine a combination of SiPs 11, 12, 13 and 14 for each application by the program portion 305 and perform parallel computation processing by the combination of SiPs even if the SiPs are operated asynchronously. In other words, even if a certain SiP 10 (e.g. 11) operates at 1 GHz and another SiP 10 (e.g. 12) operates at 2 GHz, parallel processing computation can be performed without synchronizing the SiPs.

Embodiment 2

The embodiment 2 of the present invention will now be described with reference to FIGS. 19 to 24. This embodiment mainly shows examples of application and examples of extension of the above-mentioned embodiment 1, and particularly shows that the technique of the embodiment of the present invention has a high degree of freedom and is rich in applicability and extensibility. For simplicity of explanation, aspects same as those of the above-mentioned embodiment 1 will be omitted.

In the above-mentioned embodiment 1, a plurality of SiPs are placed exclusively in one product to construct the optical functional device 100, but the present invention is not limited thereto. If a plurality of SiPs are optically interconnected, an optical functional system as the optical functional device or a parallel computation system of this embodiment can be constructed even if departing from a form of one product. The example thereof is shown in FIG. 19.

Figure 19:
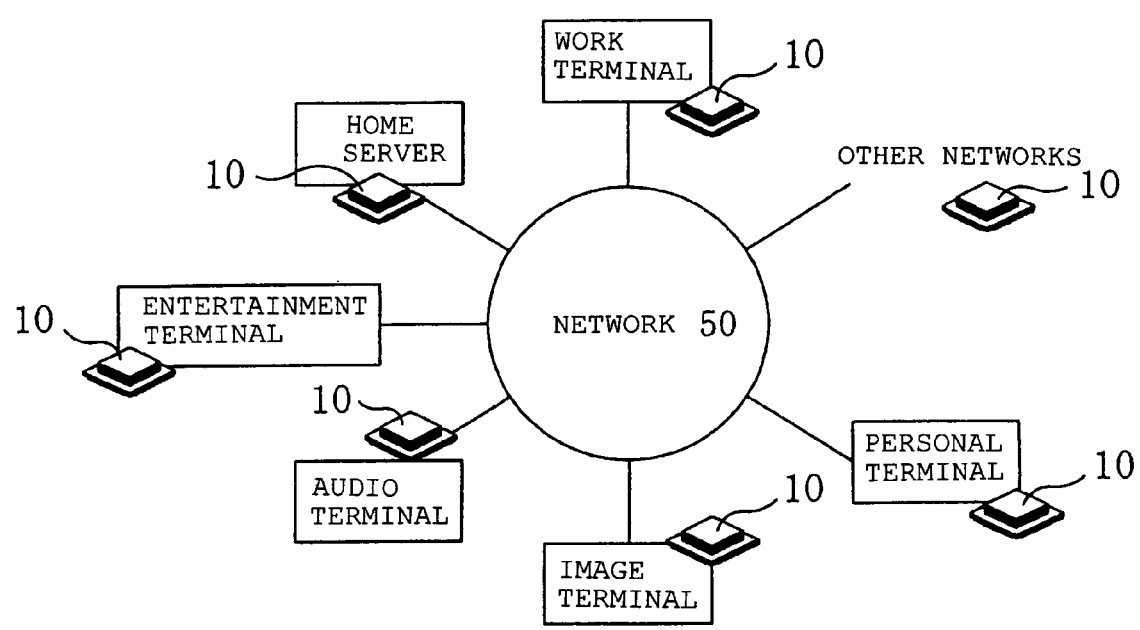
FIG. 19 shows SiPs 10 placed in a distributed manner via a network 50.

In the configuration shown in FIG. 19, the SiPs 10 included in terminals (personal terminal, image terminal, audio terminal, entertainment terminal, home server, work terminal and other networks) are optically connected via a network 50, and hence the optical functional device is constructed. The network 50 is normally an external network, but can function as the internal network 20 here.

Figure 20:
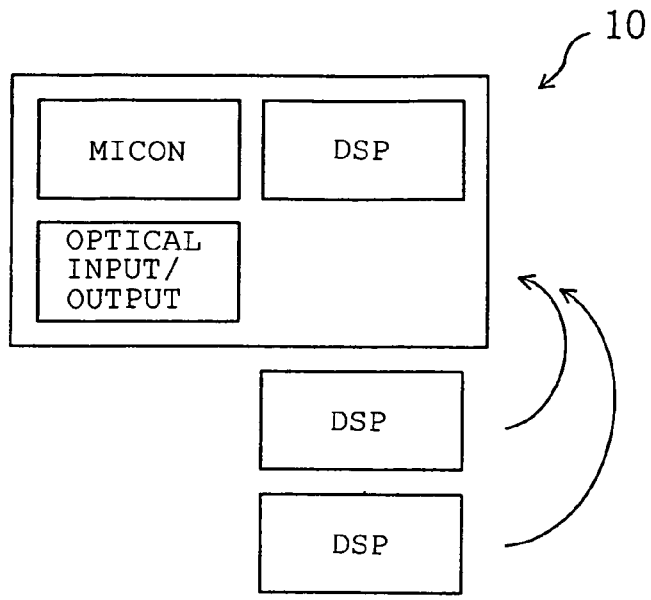
FIG. 20 is a view for explaining that a predetermined function (DSP) can be added.
Figure 21:
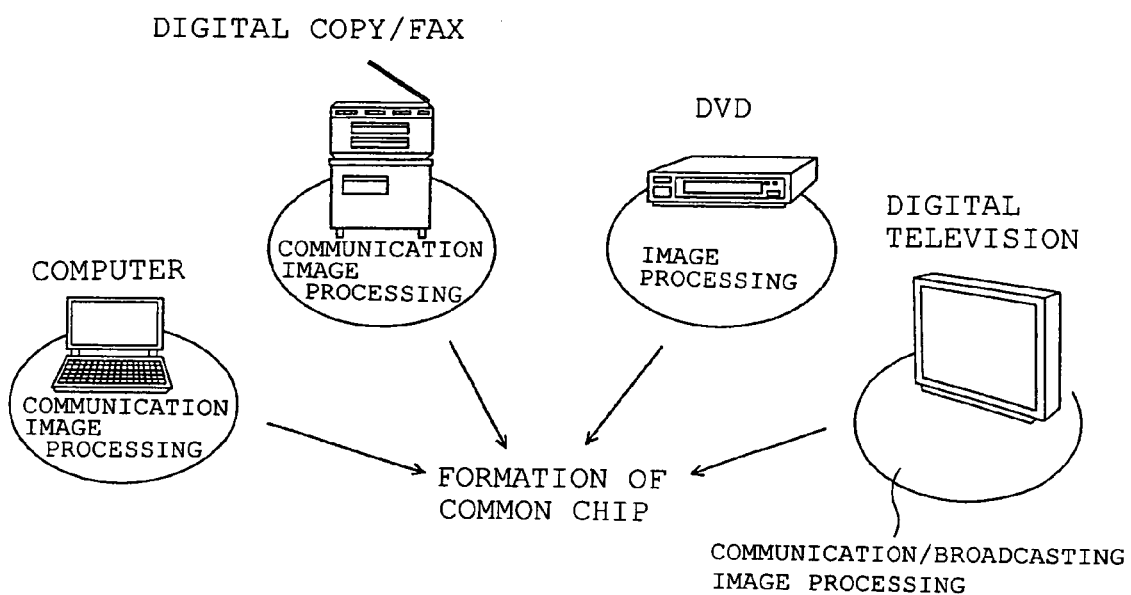
FIG. 21 is a view for explaining that a common chip capable of dealing with various applications can be provided.

As described above, the SiPs 10 are excellent in extensibility, and allow only DSPs to be newly added one after another as shown in FIG. 20. This is an advantage specific to the SiP, and in the case of the SoC, mere addition of a DPS function cannot be easily performed if considering redesign of a mask and the like.

Further, as described with FIGS. 3(a) and 3(b), construction of a module (board, etc.) dealing with a plurality of applications has a problem. If the optical functional device 100 of this embodiment is used, the capacity of a relatively inexpensive module can be sufficiently exploited by improvement of the bus width (transmission capacity), thus making it possible to produce a high-performance ultra high-function at module (210 in FIG. 3(b)) inexpensively. Thus, a common chip capable of dealing with various applications (e.g. digital television, DVD, digital copy/FAX and computer) shown in FIG. 21 can be provided. Namely, in the example shown in FIG. 21 as information processing performed by the optical functional device, an ultra high-functional module dealing with communication, broadcasting, image processing and the like can be produced inexpensively and more over, if formation of a common chip is achieved, costs can be further reduced owing to its mass production effect.

The optical functional device 100 of this embodiment can be suitably used for a high-performance/high-speed image transmission switch. In a television station, for example, image data is processed in an incompressive manner, and for dealing with this, a very expensive high-speed data transmission switch is required. If the optical functional device 100 of this embodiment is used in this application, it has a significant advantage in terms of functions and costs.

Further, there is a high possibility that the remote medical care will be developed mainly in isolated islands and remote areas, and application of the optical functional device 100 of this embodiment to the application of remote medical care image transfer in this field is also suitable. Because of medical use, a high level of image processing is required, and the optical functional device 100 of this embodiment is suitable for the high level processing. In addition, delivery of movie contents grows in demand in the internet and the like, and the optical functional device 100 of this embodiment is also suitable for applications of mass data libraries such as the video-on-demand.

The optical functional device 100 of this embodiment can also be applied to applications of high-performance modules dealing with high-speed scanning in network compatible digital copiers/printers. For example, the optical functional device 100 is suitable for application where digital transmission is performed concurrently with high-speed scanning. The optical functional device 100 of this embodiment is also suitable when a large screen monitor of high definition (20 million pixel level as one example) is subjected to image processing.

The present invention has been described with suitable embodiments, but such description does not represent limiting items, and various modifications can be made as a matter of course.

For example, in the above-mentioned embodiments, the case where functional modules constituting the optical functional device 100 are SiPs has been described as a suitable example, but there are cases where it is not necessary to exclude a SoC form on purpose while making use of advantages of the SiP. For example, there is a SiP (MCM) 10 using a SoC (system LSI chip) having the control portion 31, and the storage portion 32 and/or the application processor portion 33 provided in one chip in the configuration shown in FIG. 7. If the versatility of the SoC (system LSI chip) is high, the chip is easily used, and therefore it is not necessary to avoid use of the form of the SoC on purpose.

If a SoC (system LSI chip) having a semiconductor laser portion and the like mounted on one chip is developed although it in the research phase and is not realized, there is a possibility of emergence of a chip including the computation portion 31, the storage portion 32, the application processor portion 33 and the internal input/output terminal (semiconductor laser and light receiving element) 36 in the configuration shown in FIG. 7, and if the chip is produced on a large scale, it is not necessary to exclude use of the chip on purpose.

According to the present invention described above, for example, a parallel computation apparatus comprises functional modules each having an optical input/output terminal and a computation circuit connected to the optical input/output terminal, and an internal network constituting an optical transmission line connecting the optical input/output terminals of a plurality of functional modules, wherein among the plurality of functional modules, a first functional module having a first information processing capacity has a function of determining whether processing of a first information processing amount can be completed based on the first information processing capacity when the first information processing amount is input, and outputting a second information processing amount obtained by subtracting an information processing amount based on the first information processing capacity from the first information processing amount to at least one of the plurality of functional modules other than the first module if the fist module determines that the processing cannot be completed.

At least one of the plurality of functional modules preferably comprises an external terminal for connection to an external network.

The functional module is preferably constructed by a system-in-package.

In a certain suitable embodiment, the functional modules can be operated asynchronously.

For example, an optical functional device comprising a plurality of system-in-packages each including at least one laser element emitting light of multiple wavelengths, a filter filtering the light of multiple wavelengths into light of a predetermined wavelength, and a light receiving element receiving the light of a predetermined wavelength, wherein the system-in-package comprises an internal input/output terminal to which the optical transmission line is connected, and a computation processing portion connected to the internal input/output terminal, the computation processing portion is constituted by a control portion, a storage portion, and an application processor portion performing in formation processing, and the plurality of system-in-packages are interconnected by the optical transmission line via a wavelength router.

In a suitable embodiment, the wavelength router has a plurality of input ports and a plurality of output ports, and the wavelength router has a function of performing output to any uniquely determined output port of the plurality of output ports according to the wavelength of light input one input port of the plurality of input ports.

For example, an optical functional device comprising a plurality of system-in-packages each including at least one laser element emitting light of multiple wavelengths, and a light receiving element receiving light from the laser element, wherein the system-in-package comprises an internal input/output terminal to which the optical transmission line is connected, and a computation processing portion connected to the internal input/output terminal, the computation processing portion is constituted by a control portion, a storage portion, and the internal input terminal of any system-in-package is connected to the optical input/output terminal of any other system-in-package via the optical transmission line.

The system-in-package preferably further comprises an external input/output terminal connected to the computation processing portion.

In a certain suitable embodiment, the plurality of system-in-packages can be operated asynchronously.

For example, an information processing method is an information processing method using an information processing system including a plurality of system-in-packages having a computation circuit formed therein, the information processing method comprising a step (a) of inputting a first information processing amount to a first system-in-package having a first information processing capacity, a step (b) of determining whether the first system-in-package can complete processing of the first information processing amount based on the first information processing capacity, and a step (c) of outputting a second information processing amount obtained by subtracting an information processing amount based on the first information processing capacity from the first information processing amount to a second system-in-package having a second information processing capacity if it is determined that the processing cannot be completed at the step (b).

In a certain suitable embodiment, the information processing methods comprises a step (d-1) of inputting a second information processing amount to the second system-in-package, a step (d-2) of determining whether the second system-in-package can complete processing of the second information processing amount based on the second information processing capacity, and a step (d-3) of outputting a third information processing amount obtained by subtracting an information processing amount based on the second information processing capacity from the second information processing amount to a third system-in-package having a third information processing capacity if it is determined that the processing cannot be completed at the step (d-2), after the step (c).

For example, an information processing method is an information processing method using an information processing system including a plurality of system-in-packages having a computation circuit formed therein, the information processing method comprising a step (a) of inputting a first information processing amount to a first system-in-package having a first information processing capacity, a step (b) of determining whether the first system-in-package can complete processing of the first information processing amount based on the first information processing capacity, and a step (c) of outputting part of a second information processing amount obtained by subtracting an information processing amount based on the first information processing capacity from the first information processing amount to a second system-in-package having a second information processing capacity, and outputting at least part of a residue after subtracting the part from the second information processing amount to a third system-in-package having a third information processing capacity, if it is determined that the processing cannot be completed at the step (b).

In a certain suitable embodiment, the system-in-packages in the information processing system are optically interconnected.

The system-in-packages are preferably operated mutually asynchronously.

For example, an information processing method is an information processing method in which functional modules are connected by an internal network constituted by an optical transmission line, a first functional module having a first information processing capacity has a function of determining whether it can complete processing of the first information processing amount when the first information processing amount is input, and outputting a second information processing amount obtained by subtracting an information processing amount based on the first information processing capacity from the first information processing amount to at least one of a plurality of functional modules other than the first functional module if it is determined that the processing cannot be completed, thus making it possible to considerably improve the speed of data transmission between the functional modules compared with the case where the functional modules are electrically interconnected, and in addition, because the functional module has a function of determining whether it can complete processing of the first processing amount, only a single functional module is operated when the information processing amount is small, while a plurality of functional modules can be operated in cooperation to perform parallel computation when the information amount is large. Thus, in addition to the improvement of the computation speed by performing parallel computation, the improvement of the processing speed due to the high speed of data transmission between the functional modules can be achieved. In this case, the information processing method employs a configuration in which a plurality of functional modules are used and they are connected by the optical transmission line, rather than the SoC configuration, and is therefore rich in applicability and extensibility, and if the functional module is constructed with the system-in-package (SiP), further a cost-related advantage can be obtained.

For example, an optical functional device comprises a plurality of system-in-packages each including at least one laser element emitting light of multiple wavelengths, a filter and a light receiving element, each system-in-package comprises an internal input/output terminal, and a computation processing portion constituted by a control portion, a storage portion and an application processor portion performing information processing, and the system-in-packages are interconnected by an optical transmission line via a wavelength router, thus making it possible to perform optical switching processing and parallel computation processing without controlling the system-in-packages in synchronization by a specific control circuit. Since the optical functional device is constructed with a plurality of system-in-packages, the optical functional device makes it easy to additionally provide the application processor portion (e.g. DSP, etc.), and is excellent in applicability and extensibility. In addition, it has a significant cost-related advantage such as an advantage that a general-purpose chip can be used. For the wavelength router, a wavelength router having a function of performing output to a uniquely determined any output port, among a plurality of output ports, according to the wavelength of light input to one input port among a plurality of input ports may be used.

If the internal input terminal of any system-in-package is connected to the optical output terminal of any other system-in-package via the optical transmission line, the optical functional device can be constructed from the system-in-package including the laser element and the light receiving element, thus making it possible to omit the filter and the wavelength router.

In this way, the first system-in-package determines whether it can complete processing of a first information processing amount when the first information processing amount is input to the first system-in-package, and outputs a second information processing amount obtained by subtracting an information processing amount based on the first information processing capacity from the first information processing amount to the second system-in-package if it is determined that the processing cannot be completed, and therefore when information processing is performed using an information processing system including a plurality of system-in-packages, computation processing by one system-in-package alone and parallel computation processing by a plurality of system-in-packages can be performed without controlling the system-in-packages in synchronization, thus making it possible to provide an information processing method having a high degree of freedom. Namely, processing can be completed by the first system-in-package when the information processing amount is small, and processing can be completed by a plurality of system-in-packages in parallel when the information processing amount is large.

In the case where information processing is performed using the conventional information processing system including a plurality of system-in-packages, a system in which a circuit configuration is previously determined so as to obtain a solution for a certain application with optimum efficiency is employed, and therefore the above-mentioned flexible processing is not performed, thus leading to a low degree of freedom. The configuration described above allows flexible processing to be performed, and therefore has a high degree of freedom and is rich in applicability and extensibility.

After the information processing amount is output to the second system-in-package, the second system-in-package determines whether it can complete processing of the second information processing amount, and outputs a third information processing amount obtained by subtracting an information processing amount based on the second information processing capacity from the second information processing amount to a third information processing system-in-package having a third information processing capacity if it is determined that the processing cannot be completed.

Alternatively, by performing processing in which the first system-in-package determines whether it can complete processing of the first information processing amount, and then outputs part of the second information processing amount to the second system-in-package having the second information processing capacity and outputs at least part of a residue after subtracting the part from the second information processing amount to the third system-in-package having the third information processing capacity if it is determined the processing cannot be completed, computation processing by one system-in-package alone and parallel computation processing can be performed without controlling the system-in-packages in synchronization.

The multiprocessor according to the present invention has a high data transmission capacity and computation processing capacity as the entire system, and is useful as a multiprocessor capable of being used as, for example, a parallel computation apparatus and an optical functional device, and the like.

What is claimed is:

1. Multiprocessor comprising:
    a plurality of processors having an optical communication function and capable of mutually cooperating;
    an optical transmission line interconnecting said plurality of processors, the optical transmission line comprising invariant optical paths; and
    a wavelength router provided on said optical transmission line and controlling optical communication between said plurality of processors, said wavelength router having a plurality of input ports and a plurality of output ports optically coupled to said optical transmission line, wherein
    said processors constitute a system-in-package configuration having a plurality of components mutually communicating electrically,
    said system-in-package has an internal input/output terminal to which both ends of said optical transmission line are connected, and a computation processing portion connected to said internal input/output terminal, and
    said computation processing portion has a control portion, a storage portion, and an application processor portion performing information processing, wherein:
    each of the plurality of processors has:
        at least one laser element emitting light of multiple wavelengths,
        a filter filtering said light of multiple wavelengths into light of a predetermined wavelength, and
        a light receiving element receiving said light of a predetermined wavelength; and
    one or more of said plurality of processors operate mutually asynchronously, and wherein
    said wavelength router is configured to receive light input to any one of said plurality of input ports from said optical transmission line and to output light to said optical transmission line via any uniquely determined output port of said plurality of output ports, responsive to the input port of the input light and the wavelength of the input light.

2. The multiprocessor according to claim 1, wherein said optical transmission lines are provided in an independent number for each of said plurality of processors.

3. The multiprocessor according to claim 1, wherein said system-in-package further comprises an external input/output terminal connected to said computation processing portion.

4. The multiprocessor according to claim 1, wherein among said plurality of processors, a first processor having a first information processing capacity has a function of determining whether information processing of a first information processing amount can be completed based on said first information processing capacity when a first information amount is input, and outputting a second information processing amount obtained by subtracting an information processing amount based on said first information processing capacity from said first information processing amount to at least one of said plurality of processors other than said first processor if it is determined that said information processing of said first information processing amount cannot be completed.

5. The multiprocessor according to claim 4, wherein at least one of said plurality of processors other than said first processor, to which a second information processing amount is input, has a function of determining whether information processing of said second processing amount can be completed based on its own second information processing capacity, and outputting a third information processing amount obtained by subtracting an information processing amount based on said second information processing capacity from said second information processing amount to at least one of said plurality of processors other than itself and said first processor if it is determined that said information processing of said second information processing amount cannot be completed.

* * * * *